(12) United States Patent
Takagi et al.

(10) Patent No.: US 12,704,749 B2
(45) Date of Patent: Aug. 11, 2026

(54) OPTICAL COUPLER, OPTICAL COUPLING MEMBER, LIGHT SOURCE MODULE AND OPTICAL ENGINE

(71) Applicant: TDK CORPORATION, Tokyo (JP)

(72) Inventors: Yasuhiro Takagi, Tokyo (JP); Hiroki Hara, Tokyo (JP); Atsushi Shimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 317 days.

(21) Appl. No.: 18/618,562

(22) Filed: Mar. 27, 2024

(65) Prior Publication Data

US 2024/0329337 A1 Oct. 3, 2024

(30) Foreign Application Priority Data

Mar. 31, 2023 (JP) ................................ 2023-058707

(51) Int. Cl.
*G02B 6/125* (2006.01)
*G02F 1/035* (2006.01)

(52) U.S. Cl.
CPC ............ *G02F 1/035* (2013.01); *G02B 6/125* (2013.01)

(58) Field of Classification Search
CPC .. G02B 6/125; G02B 6/2804; G02B 6/29344; G02F 1/035
USPC .................................... 385/1–10, 14, 28, 46
See application file for complete search history.

(56) References Cited

U.S. PATENT DOCUMENTS 5,745,619 A * 4/1998 Li .......................... G02B 6/125 385/48
5,757,990 A * 5/1998 Miyakawa ............ G02F 1/3137 385/16
6,404,957 B1 * 6/2002 Shin ....................... G02B 6/125 385/48
6,463,188 B1 * 10/2002 Takahashi ............ G02B 6/1228 385/132
6,542,670 B1 * 4/2003 Takahashi ............ G02B 6/1228 385/14
6,643,432 B2 * 11/2003 Bouda .................... G02B 6/125 385/46

(Continued)

FOREIGN PATENT DOCUMENTS

JP 2012-048071 A 3/2012
JP 6572377 B2 9/2019

(Continued)

*Primary Examiner* — Robert Tavlykaev
(74) *Attorney, Agent, or Firm* — Oliff PLC

(57) ABSTRACT

A Y-branch type optical coupler includes an optical coupling part to which a plurality of input-side optical waveguides through which the plurality of lights propagate, and one output-side optical waveguide are connected, wherein the optical coupling part has an isosceles trapezoid shape of which the width is narrowed in a taper shape at a first angle $\alpha$ from the input side to the output side (a traveling direction of light) in a plan view, at least two input-side optical waveguides among the plurality of input-side optical waveguides are disposed symmetrically with respect to a symmetry axis of the isosceles trapezoid, are inclined at a second angle $\theta$ that is different from the first angle $\alpha$, and are connected to a lower bottom portion of the isosceles trapezoid, and the difference between the first angle and the second angle is 0.9° or more and 14.8° or less.

13 Claims, 15 Drawing Sheets

(56) References Cited

U.S. PATENT DOCUMENTS

| | | | | |
|---|---|---|---|---|
| 7,088,889 | B2 * | 8/2006 | Takahashi | G02B 6/125 385/27 |
| 7,664,353 | B2 * | 2/2010 | Yamamoto | G02B 6/125 385/45 |
| 8,031,994 | B2 * | 10/2011 | Juni | G06F 3/0421 345/175 |
| 10,422,957 | B2 * | 9/2019 | Mekis | G02B 6/2808 |
| 11,543,591 | B2 * | 1/2023 | Sakamoto | G02B 6/125 |
| 2003/0219188 | A1 * | 11/2003 | Doi | G02F 1/225 385/11 |
| 2004/0008944 | A1 * | 1/2004 | Johannessen | G02B 6/125 385/45 |
| 2011/0262071 | A1 * | 10/2011 | Mitomi | G02F 1/0508 385/2 |
| 2013/0064492 | A1 * | 3/2013 | Ishikawa | G02B 6/12007 385/2 |
| 2017/0052423 | A1 | 2/2017 | Okamoto | |
| 2019/0056552 | A1 | 2/2019 | Sakamoto et al. | |
| 2019/0146302 | A1 | 5/2019 | Iwatsuka et al. | |
| 2021/0165163 | A1 | 6/2021 | Sakamoto et al. | |
| 2023/0222375 | A1 * | 7/2023 | Ishiguro | G06N 10/40 716/100 |

FOREIGN PATENT DOCUMENTS

| | | | |
|---|---|---|---|
| JP | 2020-027170 | A | 2/2020 |
| JP | 6728596 | B2 | 7/2020 |
| JP | 6787397 | B2 | 11/2020 |

* cited by examiner 400
40-1(40)
40-2(40)
40-3(40)
43
45
41
42
46
44
221-1
221-2
221-3
251-1
251-2
251-3
101M
103
52
50
22o
22
28
27
26
25
133
132
131

OPTICAL COUPLER, OPTICAL COUPLING MEMBER, LIGHT SOURCE MODULE AND OPTICAL ENGINE

CROSS-REFERENCE TO RELATED APPLICATION

Priority is claimed on Japanese Patent Application No. 2023-058707, filed Mar. 31, 2023, the content of which is incorporated herein by reference.

BACKGROUND OF THE INVENTION

Field of the Invention

The present disclosure relates to an optical coupler, an optical coupling member, a light source module, and an optical engine.

Description of Related Art

Currently, glasses-type terminals are being considered in xR technologies such as virtual reality (VR) and augmented reality (AR). Particularly in recent years, retinal scanning displays that allow a user to visually recognize images by focusing two-dimensionally scanned light on the user's retina have attracted attention. In general, in a retinal scanning display, three-color visible light emitted from light sources such as a light emitting diode (LED) and a laser diode (LD) corresponding to each color of R (red), G (green), and B (blue) are coupled onto one optical axis. The coupled three-color visible light is transmitted to an image display part. The image display part scans the transmitted light two-dimensionally and makes it to be incident on the user's pupil. Due to this incident light forming an image on the user's retina, the user visually recognizes the image. In this case, the retina is a screen that displays the image.

For example, Patent Document 1 discloses a configuration of a retinal projection display using a Mach-Zehnder type optical modulator.

PATENT DOCUMENTS

[Patent Document 1] Japanese Patent No. 6728596

[Patent Document 2] Japanese Patent No. 6787397

[Patent Document 3] Japanese Patent No. 6572377

[Patent Document 4] Japanese Unexamined Patent Application, First Publication No. 2012-48071

[Patent Document 5] Japanese Unexamined Patent Application, First Publication No. 2020-27170

SUMMARY OF THE INVENTION

In the retinal projection display disclosed in Patent Document 1, although a plurality of optical waveguides are placed close to each other at an emission part, since they are not coupled, the optical axis for each of wavelengths is different, and control of the emitted light becomes complicated.

Furthermore, there is a need for an optical coupler that can be connected or integrated with a visible light modulator and can adjust an RGB color balance, but this has not been considered at all at present.

However, in Patent Document 1, the optical waveguides are only placed close to each other at the emission part and are not coupled. Therefore, the optical axis for each of wavelengths is different, and thus the control of the emitted light becomes complicated.

Further, Patent Document 2 discloses a visible light modulator using a lithium niobate film. There is a need for an RGB optical coupler that can be connected or integrated with a visible light modulator using a lithium niobate film, but it has not yet been considered.

Regarding the coupling of visible light, directional couplers are generally being considered (refer to, for example, Patent Document 3). They are made of a glass-based material and have excellent stability, but when a lithium niobate substrate with a large $\Delta n$ (a difference in refractive index between core and quad) is used, a coupling length becomes long, and miniaturization is not possible.

Patent Document 4 and Patent Document 5 disclose configurations of RGB couplers using multimode interferometers (MMI), but both are made of glass-based materials, and the configuration using a lithium niobate film is not disclosed at all.

It is desirable that RGB light emitted from an optical coupler be emitted in a single mode. The single-mode light is desirable because it does not cause mode dispersion during light propagation, light propagation loss is smaller and a propagation speed is faster than in multi-mode light. However, there has been no specific proposal regarding a small optical coupler that can be mounted in a glasses-type terminal or the like, as an optical coupler that allows multi-mode elimination and enables emission in a single mode.

The present disclosure has been made in view of the above problems, and an object thereof is to provide an optical coupler, an optical coupling member, a light source module, and an optical engine capable of being connected to or integrated with an optical modulator using a lithium niobate film and capable of eliminating multi-mode and enabling emission in a single mode.

The present disclosure provides the following means to solve the above problems.

A first aspect of the present disclosure is an optical coupler that couples a plurality of lights with different wavelengths, including an optical coupling part to which a plurality of input-side optical waveguides through which the plurality of lights propagate, and one output-side optical waveguide are connected, wherein the optical coupling part has an isosceles trapezoid shape of which the width is narrowed in a taper shape at a first angle from an input side to an output side in a plan view, at least two input-side optical waveguides among the plurality of input-side optical waveguides are disposed symmetrically with respect to a symmetry axis of the isosceles trapezoid, are inclined at a second angle that is different from the first angle, and are connected to a lower bottom portion of the isosceles trapezoid, and a difference between the first angle and the second angle is 0.9° or more and 14.8° or less.

According to a second aspect of the present disclosure, in the optical coupler of the first aspect, the plurality of input-side optical waveguides may include four or more input-side optical waveguides disposed symmetrically with respect to the symmetry axis, and two input-side optical waveguides adjacent to each other without sandwiching the symmetry axis may be connected to the lower bottom portion of the isosceles trapezoid with one inclined at the second angle with respect to the other.

According to a third aspect of the present disclosure, in the optical coupler of the first aspect, the plurality of input-side optical waveguides may include an input-side optical waveguide that extends along the symmetry axis and that is connected to the lower bottom portion of the isosceles trapezoid shape.

According to a fourth aspect of the present disclosure, in the optical coupler of the second aspect, the plurality of input-side optical waveguides may include an input-side optical waveguide that extends along the symmetry axis and that is connected to the lower bottom portion of the isosceles trapezoid shape.

According to a fifth aspect of the present disclosure, in the optical coupler of the first aspect, the number of the plurality of input-side optical waveguides may be two, and the length of the optical coupling part may be 6 μm or more and 303 μm or less.

According to a sixth aspect of the present disclosure, in the optical coupler of the first aspect, the plurality of the plurality of input-side optical waveguides may be four, and the length of the optical coupling part may be 16 μm or more and 238 μm or less.

According to a seventh aspect of the present disclosure, in the optical coupler of the first aspect, the plurality of the plurality of input-side optical waveguides may be three, and the length of the optical coupling part may be 9 μm or more and 490 μm or less.

An eighth aspect of the present disclosure is an optical coupling member including a substrate made of a material different from lithium niobate, and an optical coupling functional layer made of a lithium niobate film and formed on a main surface of the substrate, wherein the optical coupler according to any one of the first to seventh aspects is formed in the optical coupling functional layer.

A ninth aspect of the present disclosure is a light source module including the optical coupling member according to the eighth aspect, and a plurality of laser light sources configured to emit lights that are coupled by the optical coupling member.

A tenth aspect of the present disclosure is an optical coupling member with an optical modulation function, including the optical coupling member according to the eighth aspect, and a Mach-Zehnder type optical modulator connected to the optical coupling member and configured to guide a plurality of lights emitted from a plurality of laser light sources to the optical coupling member.

An eleventh aspect of the present disclosure is a light source module including the optical coupling member with a light modulation function according to the tenth aspect, and a plurality of laser light sources configured to emit lights to be coupled by the optical coupling member with a light modulation function.

A twelfth aspect of the present disclosure is an optical engine including the light source module according to the ninth aspect, and a light scanning mirror configured to reflect the light emitted from the light source module by changing an angle to display an image.

A thirteenth aspect of the present disclosure is an optical engine including the light source module according to the eleventh aspect, and a light scanning mirror configured to reflect the light emitted from the light source module by changing an angle to display an image.

According to the optical coupler of the present disclosure, it is possible to provide a Y-branch type optical coupler that can be connected or integrated with an optical modulator using a lithium niobate film, can eliminate multi-mode, and enables emission in a single mode.

BRIEF DESCRIPTION OF THE DRAWINGS

FIG. 12 is a schematic plan view of still another example of the light source module according to the first embodiment.

FIG. 13 is a schematic plan view of a light source module according to a second embodiment.

DETAILED DESCRIPTION OF THE INVENTION

Figure 1:
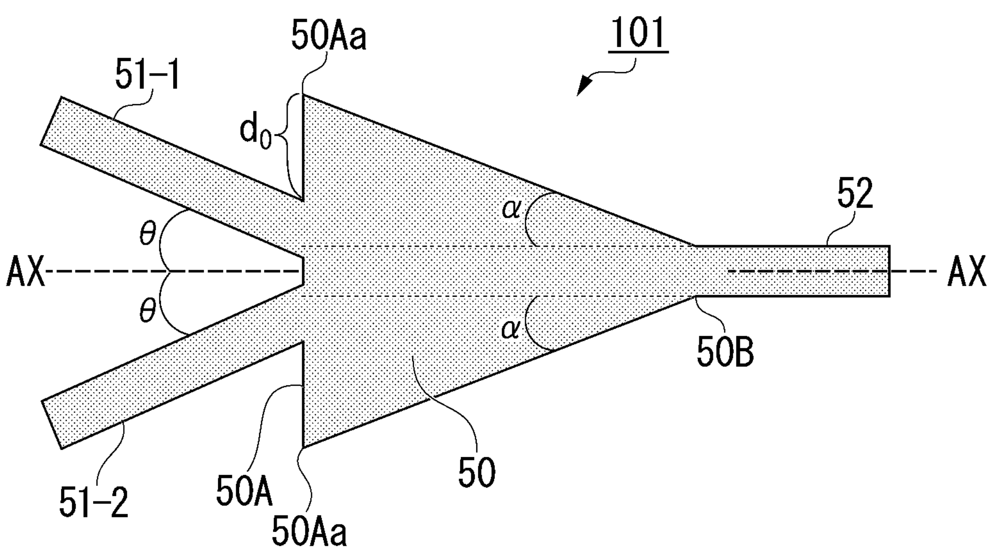
FIG. 1 is a schematic plan view conceptually showing an example of a Y-branch type optical coupler according to an embodiment of the present disclosure.

Hereinafter, embodiments will be described in detail with reference to the drawings as appropriate. In the drawings used in the following description, characteristic parts may be shown to be enlarged for convenience in order to make the characteristics easier to understand, and dimensional ratios of each of components may be different from actual ones. Materials, dimensions, and the like exemplified in the following description are merely examples, and the present disclosure is not limited thereto, and can be implemented with appropriate changes within the scope of achieving the effects of the present disclosure.

[Y-Branch Type Optical Coupler]

FIG. 1 is a schematic plan view conceptually showing an example of a Y-branching optical coupler according to an embodiment of the present disclosure.

The Y-branch type optical coupler 101 shown in FIG. 1 is a Y-branch type optical coupler that couples a plurality of lights with different wavelengths, and includes an optical coupling part 50 to which a plurality of input-side optical waveguides 51-1 and 51-2 through which the plurality of lights propagate, and one output-side optical waveguide 52 are connected, wherein the optical coupling part 50 has an isosceles trapezoidal shape of which the width is narrowed in a taper shape at a first angle α from the input side to the output side (in a traveling direction of light) in a plan view, and at least two input-side optical waveguides 51-1 and 51-2 of the plurality of input-side optical waveguides are disposed symmetrically with respect to an axis of symmetry of the isosceles trapezoid, and are connected to a lower bottom portion 50A of the isosceles trapezoid while being inclined at a second angle θ that is different from the first angle α. The isosceles trapezoid of the optical coupling part 50 is symmetrical with respect to the axis AX of symmetry that extends in an extending direction of the output-side optical waveguide 52.

The Y-branch type optical coupler 101 may be an optical coupler that couples visible lights.

In the Y-branch type optical coupler 101 shown in FIG. 1, due to the configuration in which the optical coupling part 50 has an isosceles trapezoid shape of which the width is narrowed in a taper shape at the first angle α from the input side to the output side (in the traveling direction of light) and also the first angle α and the second angle θ are different angles, high-order modes can be curbed, and thus a plurality of lights with different wavelengths can be coupled with low loss.

The plurality of input-side optical waveguides are two input-side optical waveguides, and the length of the optical coupling part 50 is such that high-order modes can be curbed and the plurality of lights with different wavelengths can be coupled with low loss, and is for example, 6 μm or more, and 303 μm or less.

A difference between the first angle α and the second angle θ is 0.9° or more and 14.8° or less. Due to a configuration in which the difference between the first angle α and the second angle θ is 0.9° or more and 14.8° or less being adopted, high-order modes are further curbed and the plurality of lights with different wavelengths are coupled with low loss.

Further, preferably, a distance $d_0$ between an end 50Aa of the lower bottom portion 50A of the optical coupling part 50 in a width direction and an input-side optical waveguide 21-1 disposed closest to the end 50Aa in the width direction among the plurality of input-side optical waveguides is 2 μm or less. Due to the distance $d_0$ set to 2 μm or less, high-order modes are further curbed, and the plurality of lights with different wavelengths can be coupled with low loss.

Figure 2:
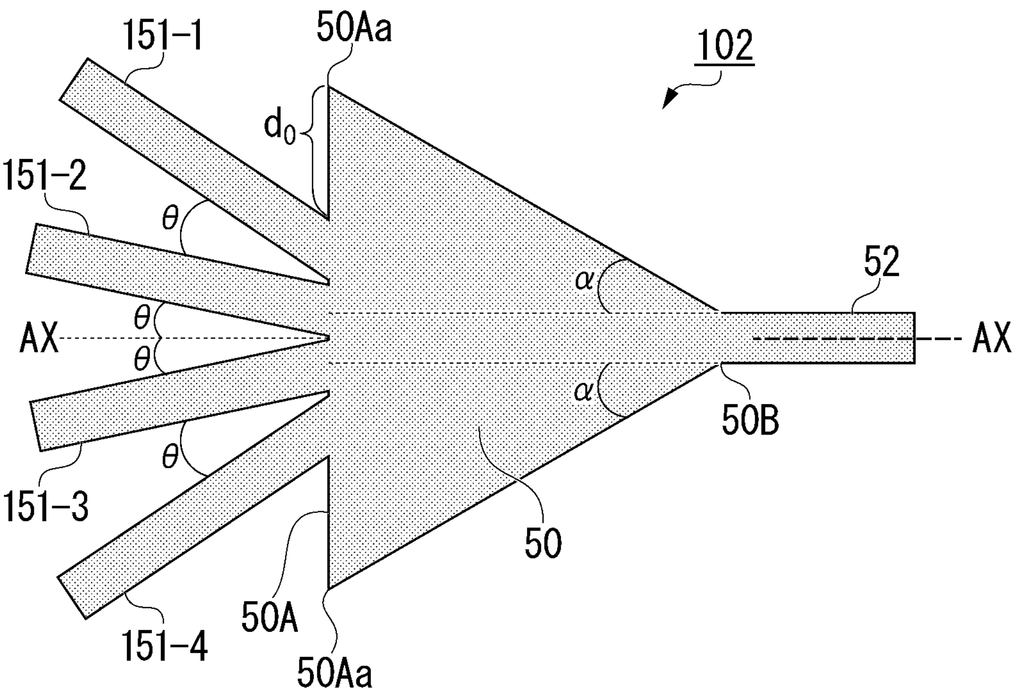
FIG. 2 is a schematic plan view conceptually showing another example of the Y-branch type optical coupler according to the embodiment of the present disclosure.

FIG. 2 is a schematic plan view conceptually showing another example of the Y-branch type optical coupler according to the embodiment of the present disclosure.

The Y-branch type optical coupler 102 shown in FIG. 2 is a Y-branch type optical coupler that couples a plurality of lights with different wavelengths, and includes an optical coupling part 50 to which a plurality of input-side optical waveguides 151-1, 151-2, 151-3 and 151-4 through which a plurality of lights propagate, and one output-side optical waveguide 52 are connected, wherein the optical coupling part 50 has an isosceles trapezoidal shape of which the width is narrowed in a taper shape at a first angle from the input side to the output side (in the traveling direction of light) in a plan view, and the plurality of input-side optical waveguides are four input-side optical waveguides 151-1, 151-2, 151-3 and 151-4. Among the four input-side optical waveguides 151-1, 151-2, 151-3 and 151-4, the two input-side optical waveguides 151-2 and 151-3 adjacent to each other with the axis AX of symmetry of the isosceles trapezoid interposed therebetween are disposed symmetrically with respect to the axis of symmetry AX, and are connected to a lower bottom portion 50A of the isosceles trapezoid shape while being inclined at a second angle θ that is different from the first angle α. Further, the remaining input-side optical waveguides 151-1 and 151-4 other than the two adjacent input-side optical waveguides 151-2 and 151-3 are disposed in the same number symmetrically with respect to the axis AX of symmetry, and are connected to the lower bottom portion 50A of the isosceles trapezoid shape while being inclined at the second angle θ with respect to the adjacent input-side optical waveguides. The two input-side optical waveguides 151-1 and 151-2 adjacent to each other without the axis of symmetry therebetween, or the two input-side optical waveguides 151-3 and 151-4 are connected to the lower bottom portion of the isosceles trapezoid with one inclined at the second angle θ with respect to the other. In the Y-branch type optical coupler 102 shown in FIG. 2, the plurality of input-side optical waveguides may be an even number of four or more input-side optical waveguides.

The Y-branch type optical coupler 102 may be an optical coupler that couples visible lights.

In the Y-branch type optical coupler 102 shown in FIG. 2, due to a configuration in which the optical coupling part 50 has an isosceles trapezoid shape of which the width is narrowed in a taper shape at the first angle α from the input side to the output side (in the traveling direction of light), and also the first angle α and the second angle θ are different, high-order modes are curbed, and a plurality of lights with different wavelengths can be coupled with low loss.

The plurality of input-side optical waveguides are four input-side optical waveguides, and the length of the optical coupling part 50 is such that high-order modes are curbed and the plurality of lights of different wavelengths can be coupled with low loss, and is for example, 16 μm or more, and 238 μm or less.

The difference between the first angle α and the second angle θ is 0.9° or more and 14.8° or less. Due to the configuration in which the difference between the first angle α and the second angle θ is 0.9° or more and 14.8° or less being adopted, high-order modes are further curbed, and the plurality of lights with different wavelengths are coupled with low loss.

Further, preferably, the distance $d_0$ between the end 50Aa of the lower bottom portion 50A of the optical coupling part 50 in the width direction and the input-side optical waveguide 21-1 disposed closest to the end 50Aa in the width direction among the plurality of input-side optical waveguides is 2 μm or less. Due to the distance $d_0$ set to 2 μm or less, high-order modes are further curbed, and the plurality of lights of different wavelengths can be coupled with low loss.

Figure 3:
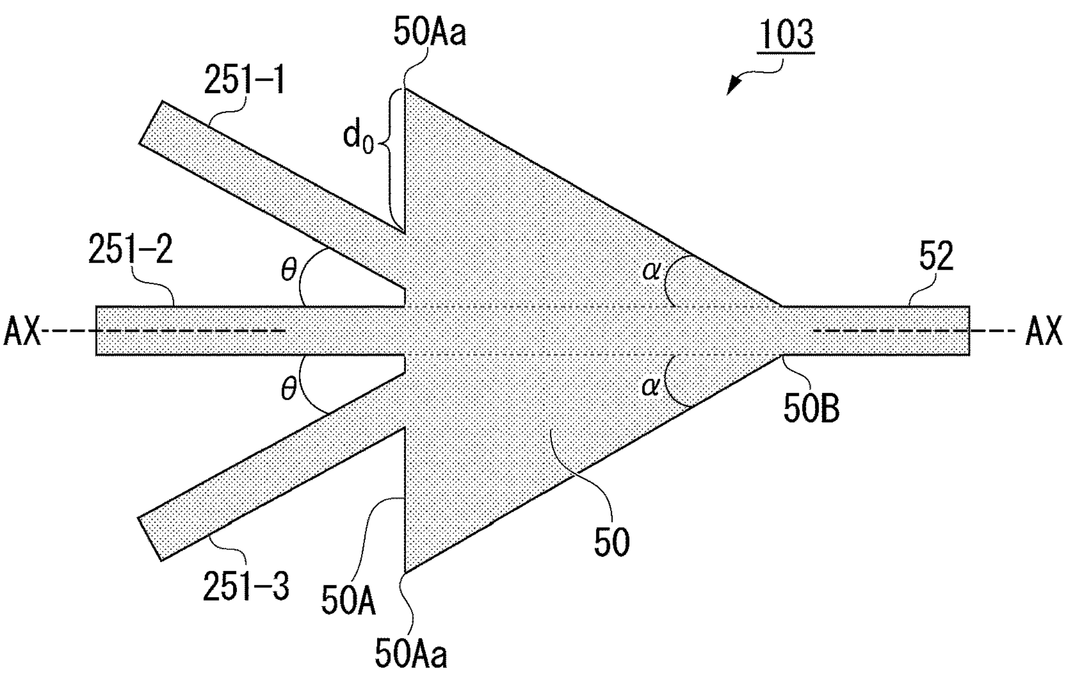
FIG. 3 is a schematic plan view conceptually showing still another example of the Y-branching optical coupler according to the embodiment of the present disclosure.

FIG. 3 is a schematic plan view conceptually showing still another example of the Y-branch type optical coupler according to the embodiment of the present disclosure.

The Y-branch type optical coupler 103 shown in FIG. 3 is a Y-branch type optical coupler that couples a plurality of lights with different wavelengths, and includes an optical coupling part 50 to which a plurality of input-side optical waveguides 251-1, 251-2 and 251-3 through which a plurality of lights propagate, and one output-side optical waveguide 52 are connected, wherein the optical coupling part 50 has an isosceles trapezoidal shape of which the width is narrowed in a taper shape at a first angle from the input side to the output side (in the traveling direction of light) in a plan view, the plurality of input-side optical waveguides are three input-side optical waveguides 251-1, 251-2 and 251-3, one input-side optical waveguide 251-2 among the three input-side optical waveguides 251-1, 251-2 and 251-3 is connected to the lower bottom portion 50A of the isosceles trapezoid shape so as to extend along the axis of symmetry AX, and the remaining input-side optical waveguides 251-1 and 251-3 other than one input-side optical waveguide 251-2 are disposed symmetrically in the same number with respect to one input-side optical waveguide 251-2, and are connected to the lower bottom portion 50A of the isosceles trapezoid shape while being inclined at a second angle θ with respect to the adjacent input-side optical waveguide.

In the Y-branch type optical coupler 103 shown in FIG. 3, the plurality of input-side optical waveguides may be an odd number of three or more input-side optical waveguides.

The Y-branch type optical coupler 103 may be an optical coupler that couples visible lights.

In the Y-branch type optical coupler 103 shown in FIG. 3, due to the configuration in which the optical coupling part 50 has an isosceles trapezoid shape of which the width is narrowed in a taper shape at the first angle α from the input side to the output side (in the traveling direction of light) and also the first angle α and the second angle θ are different, high-order modes are curbed, and a plurality of lights with different wavelengths can be coupled with low loss.

The plurality of input-side optical waveguides are three input-side optical waveguides, and the length of the optical coupling part 50 is such that high-order modes can be curbed and the plurality of lights of different wavelengths can be coupled with low loss, and is for example, 9 μm or more, and 490 μm or less.

The difference between the first angle α and the second angle θ is 0.9° or more and 14.8° or less. Due to the configuration in which the difference between the first angle α and the second angle θ is 0.9° or more and 14.8° or less being adopted, high-order modes are further curbed, and the plurality of lights with different wavelengths are coupled with low loss.

Further, preferably, the distance $d_0$ between the end 50Aa of the lower bottom portion 50A of the optical coupling part 50 in the width direction and the input-side optical waveguide 21-1 disposed closest to the end 50Aa in the width direction among the plurality of input-side optical waveguides is 2 μm or less. Due to the distance $d_0$ set to 2 μm or less, high-order modes are further curbed, and the plurality of lights of different wavelengths can be coupled with low loss.

[Optical Coupling Member]

An optical coupling member according to an embodiment of the present disclosure includes a substrate made of a material different from lithium niobate, and an optical coupling functional layer made of a lithium niobate film and formed on a main surface of the substrate, and the Y-branch type optical coupler according to the embodiment of the present disclosure is formed in the optical coupling functional layer.

Figure 4:
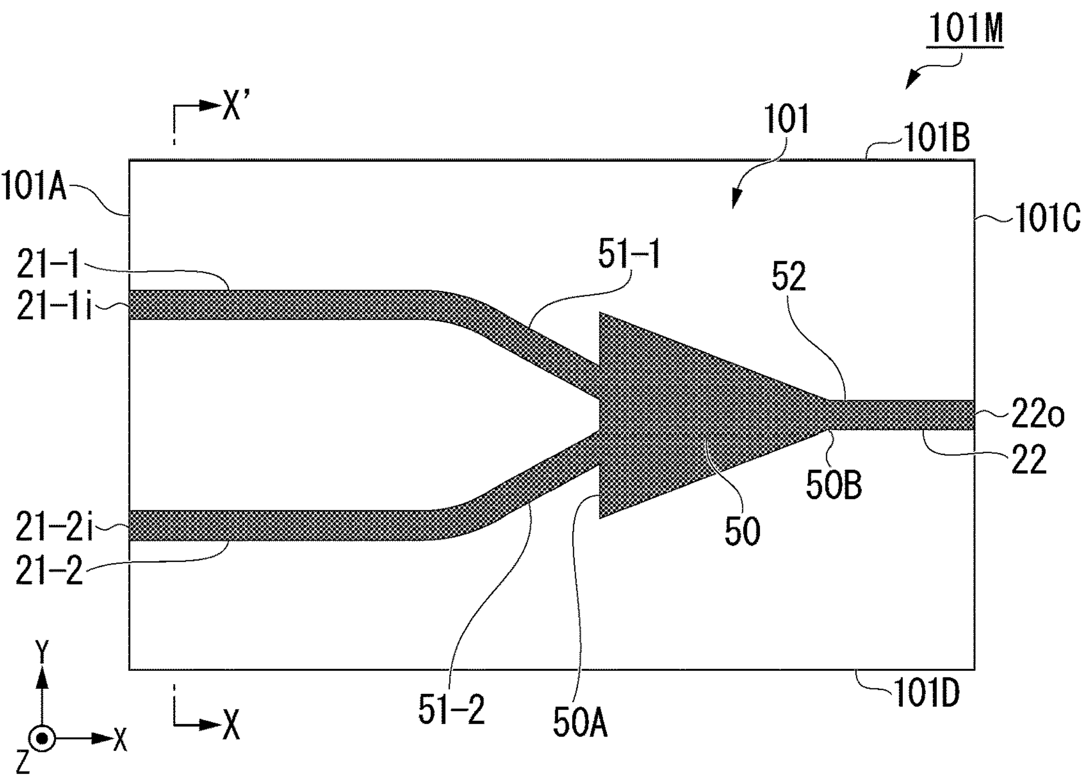
FIG. 4 is a schematic plan view of an optical coupling member (two-input type) according to an embodiment of the present disclosure.
Figure 5:
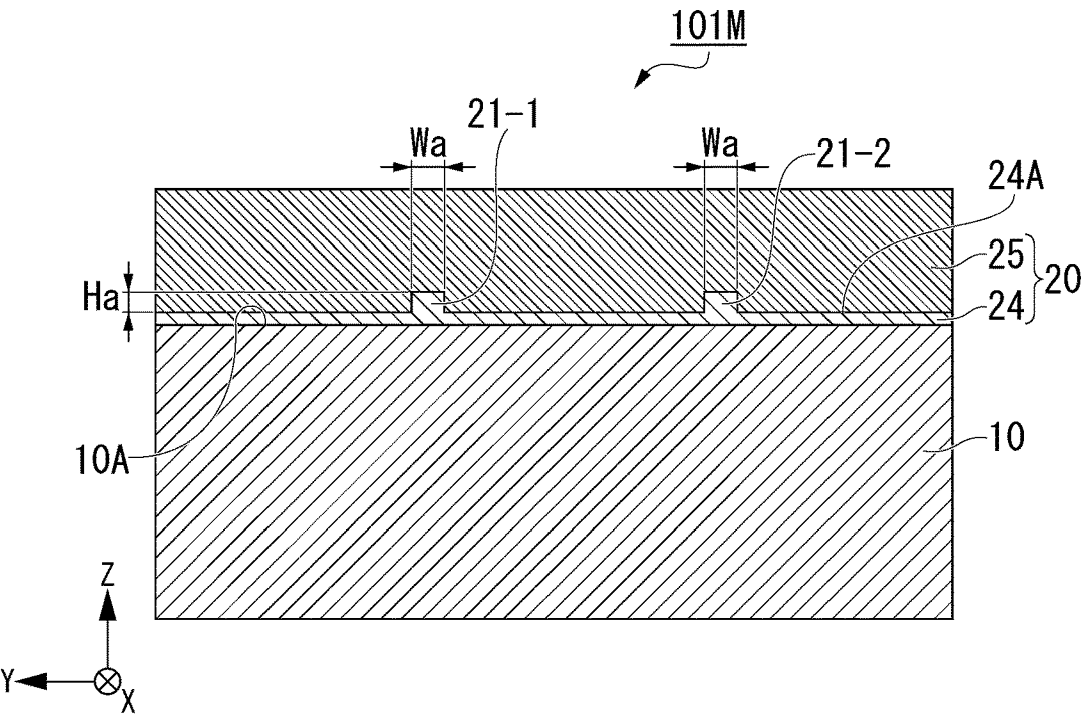
FIG. 5 is a schematic cross-sectional view of the optical coupling member shown in FIG. 4 taken along an YZ plane.

FIG. 4 is a schematic plan view of an optical coupling member 101M in which the Y-branch type optical coupler 101 shown in FIG. 1 is formed in an optical coupling functional layer made of lithium niobate, and FIG. 5 is a schematic cross-sectional view of the optical coupling member 101M taken along a YZ plane (X-X' in FIG. 4).

In FIGS. 4 and 5, an X direction is a direction perpendicular to a side surface 101A in which a light incidence port is disposed, a Y direction is a direction perpendicular to the X direction, and a Z direction is perpendicular to a plane formed by the X direction and the Y direction.

The optical coupling member 101M shown in FIG. 4 includes a substrate 10 made of a material different from lithium niobate, and an optical coupling functional layer 20 formed on a main surface of the substrate 10 and made of lithium niobate, and the Y-branch type optical coupler 101 is formed in the optical coupling functional layer 20.

In the optical coupling member 101M, in a case in which a difference in refractive index between a waveguide core film and a waveguide cladding film is Δn, when the waveguide core film is made of lithium niobate, Δn can be designed to a larger value than when a material such as glass is used, a radius of curvature of the optical waveguide can be reduced, and thus it is possible to achieve both improved design freedom and miniaturization.

The optical coupling member 101M shown in FIG. 4 includes a first optical input-side optical waveguide 21-1 and a second optical input-side optical waveguide 21-2 which are respectively connected to the two light incidence ports (a first light incidence port 21-1*i* and a second light incidence port 21-2*i*) provided on the first side surface 101A, and also includes an optical output-side optical waveguide 22 connected to one light emission port 220 provided on a third side surface 101C opposite to the first side surface 101A. The light emission port 220 may be provided on a second side surface 101B or a fourth side surface 101C which is a surface orthogonal to the first side surface 101A.

The first optical input-side optical waveguide 21-1 is connected to the input-side optical waveguide 51-1 connected to the optical coupling part 50, and also the second optical input-side optical waveguide 21-2 is connected to the input-side optical waveguide 51-2 connected to the optical coupling part 50. The optical output-side optical waveguide 22 is connected to the optical output-side optical waveguide 52 connected to the optical coupling part 50.

The optical coupling functional layer 20 is configured of a waveguide core film 24 made of a lithium niobate film in which the light incidence port, the light emission port, the light coupling part and the optical waveguide are formed, and a waveguide cladding (buffer) film 25 formed on the waveguide core film 24 so as to cover them. Hereinafter, the reference numeral 24 may be used for the lithium niobate film.

Examples of the substrate 10 include a sapphire substrate, a Si substrate, and a thermally oxidized silicon substrate.

Since the optical coupling functional layer 20 is made of a lithium niobate ($LiNbO_3$) film, it is not particularly limited as long as it has a lower refractive index than that of the lithium niobate film, but as a substrate on which a single crystal lithium niobate film can be formed as an epitaxial film, a sapphire single crystal substrate or a silicon single crystal substrate is preferable. Although a crystal orientation of the single crystal substrate is not particularly limited, for example, since a c-axis oriented lithium niobate film has three-fold symmetry, it is desirable that the underlying single-crystal substrate has the same symmetry, and in the case of a sapphire single crystal substrate, a c-plane substrate is preferable, and in the case of a silicon single crystal substrate, a (111)-plane substrate is preferable.

The lithium niobate film is, for example, a c-axis oriented lithium niobate film. The lithium niobate film is, for example, an epitaxial film grown epitaxially on the substrate 10. The epitaxial film is a single crystal film of which a crystal orientation is aligned by the underlying substrate. The epitaxial film is a film that has a single crystal orientation in a z direction and an in-plane direction of an xy plane, and crystals thereof are aligned in x-axis, y-axis and z-axis directions. Whether or not the film formed on the substrate 10 is an epitaxial film can be verified, for example, by checking a peak intensity and a polar point at an alignment position in 2θ-θ X-ray diffraction.

Specifically, when measurement is performed by the 2θ-θ X-ray diffraction, all peak intensities other than a target plane are 10% or less, preferably 5% or less of the maximum peak intensity of the target plane. For example, when the lithium niobate film is a c-axis oriented epitaxial film, the peak intensity other than a (00L) plane is 10% or less, preferably 5% or less of the maximum peak intensity of the (00L) plane. Here, (00L) is a general term for equivalent surfaces such as (001) and (002).

Further, in conditions for confirming the peak intensity at the orientation position described above, only orientation in one direction is indicated. Therefore, even in the case in which the above-described conditions are obtained, when the crystal orientation is not aligned within the plane, intensity of the X-rays will not increase at a specific angular position, and no pole point will be observed. For example, when the lithium niobate film is a lithium niobate film, since $LiNbO_3$ has a trigonal crystal structure, $LiNbO_3$ (014) in the single crystal has three pole points. In the case of lithium niobate, it is known that epitaxial growth occurs in a so-called twin crystal state in which crystals rotated by 180° around the c-axis are symmetrically coupled. In this case, two of the three pole points are symmetrically connected, and thus there are six pole points. Furthermore, when a lithium niobate film is formed on a (100) plane silicon single crystal substrate, 4×3=12 pole points are observed because the substrate has a four-fold symmetry. In the present disclosure, the lithium niobate film epitaxially grown in the twin crystal state is also included in the epitaxial film.

The composition of lithium niobate is $Li_xNbA_yO_z$. A is an element other than Li, Nb, and O. x is 0.5 or more and 1.2 or less, preferably 0.9 or more and 1.05 or less. y is 0 or more and 0.5 or less. z is 1.5 or more and 4.0 or less, preferably 2.5 or more and 3.5 or less. The element of A includes, for example, K, Na, Rb, Cs, Be, Mg, Ca, Sr, Ba, Ti, Zr, Hf, V, Cr, Mo, W, Fe, Co, Ni, Zn, Sc, Ce, and two or more of these elements may be combined.

Further, the lithium niobate film may be a lithium niobate single crystal thin film bonded onto a substrate.

A thickness of the lithium niobate film is, for example, 2 μm or less. The thickness of the lithium niobate film refers to a thickness of a portion other than a ridge. The thickness of the lithium niobate film may be optimally designed according to a wavelength used, a shape of the ridge, or the like.

The waveguide is a ridge protruding from a first surface 24A of the lithium niobate film 24. The first surface 24A is an upper surface of a portion (a slab layer) of the lithium niobate film 24 other than the ridge.

As shown in FIG. 4, a cross-sectional shape of a regular cross-sectional shape of each of the optical waveguides 21-1 and 21-2 is rectangular, but any shape that can guide light may be used, for example, it may have a trapezoidal shape, a triangular shape, a semicircular shape, or the like. The same applies to the input-side optical waveguides 51-1 and 51-2 and the output-side optical waveguide 52. A width Wa of three ridges in the y direction is preferably 0.2 μm or more and 5.0 μm or less, and a height of each of the three ridges (a protrusion height Ha from the first surface 24A) is preferably, for example, 0.1 μm or more and 1.0 μm or less. The same applies to other optical waveguides.

Single mode propagation is possible by making the size of each of the optical waveguide 21-1, the optical waveguide 21-2, the input-side optical waveguides 51-1 and 51-2, and the output-side optical waveguide 52 approximately the same as the wavelength of laser light.

Figure 6:
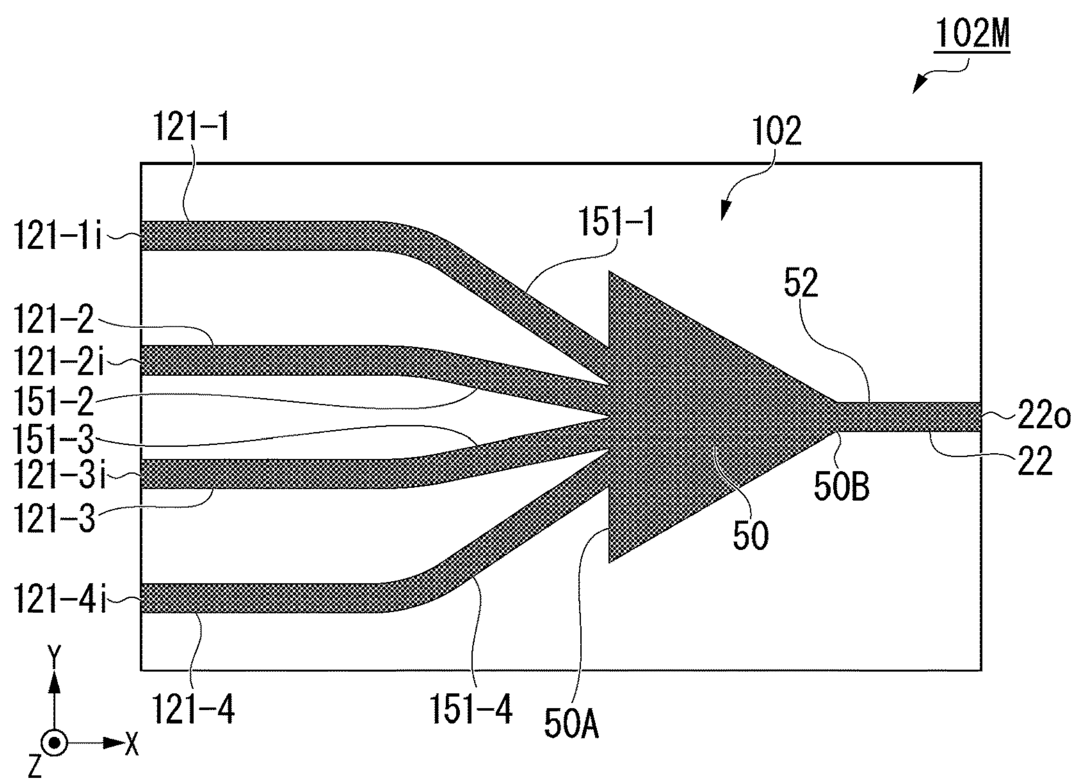
FIG. 6 is a schematic plan view of an optical coupling member (4-input type) according to an embodiment of the present disclosure.

FIG. 6 is a schematic plan view of an optical coupling member 102M in which the Y-branch type optical coupler 102 shown in FIG. 2 is formed in an optical coupling functional layer made of lithium niobate. Since the schematic cross-sectional view taken along the YZ plane (X-X' in FIG. 4) of the optical coupling member 102M is also the same as in FIG. 5 except for the number of input-side optical waveguides, it will be omitted here, but the same components will be described below using the reference numerals shown in FIG. 5.

The optical coupling member 102M shown in FIG. 6 includes a substrate 10 made of a material different from lithium niobate, and an optical coupling functional layer 20 formed on a main surface of the substrate 10 and made of lithium niobate, and the Y-branch type optical coupler 102 is formed in the optical coupling functional layer 20.

The optical coupling member 102M shown in FIG. 6 includes a first optical input-side optical waveguide 121-1, a second optical input-side optical waveguide 121-2, a third optical input-side optical waveguide 121-3, and a fourth optical input-side optical waveguide 121-4 which are respectively connected to four light incidence ports (a first light incidence port 121-1*i*, a second light incidence port 121-2*i*, a third light incidence port 121-3*i*, and a fourth light incidence port 121-4*i*) provided in a first side surface 101A, and also includes an optical output-side optical waveguide 22 connected to one light emission port 220 provided in a third side surface 101C opposite to the first side surface 101A.

The first optical input-side optical waveguide 121-1 is connected to an input-side optical waveguide 151-1 connected to an optical coupling part 50, the second optical input-side optical waveguide 121-2 is connected to an input-side optical waveguide 151-2 connected to the optical coupling part 50, the third optical input-side optical waveguide 121-3 is connected to an input-side optical waveguide 151-3 connected to the optical coupling part 50, and the fourth optical input-side optical waveguide 121-4 is connected to an input-side optical waveguide 151-4 connected to the optical coupling part 50. Further, the optical output-side optical waveguide 22 is connected to an optical output side optical waveguide 52 connected to the optical coupling part 50.

Figure 7:
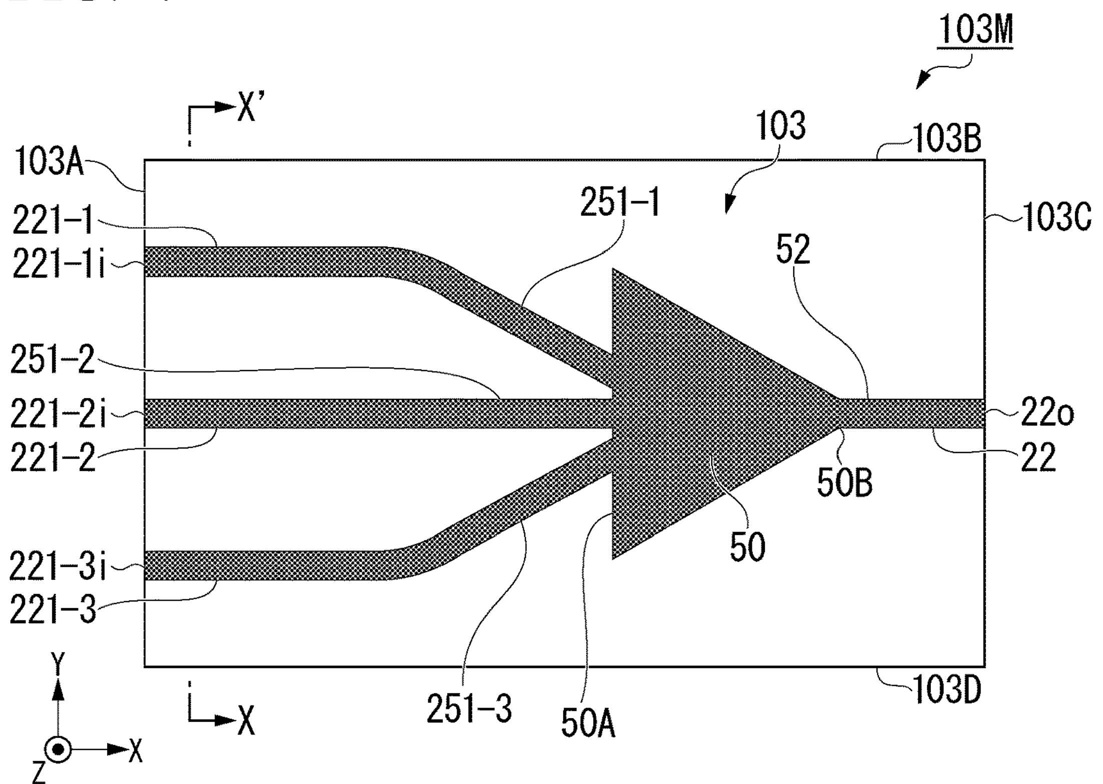
FIG. 7 is a schematic plan view of an optical coupling member (3-input type) according to an embodiment of the present disclosure.
Figure 8:
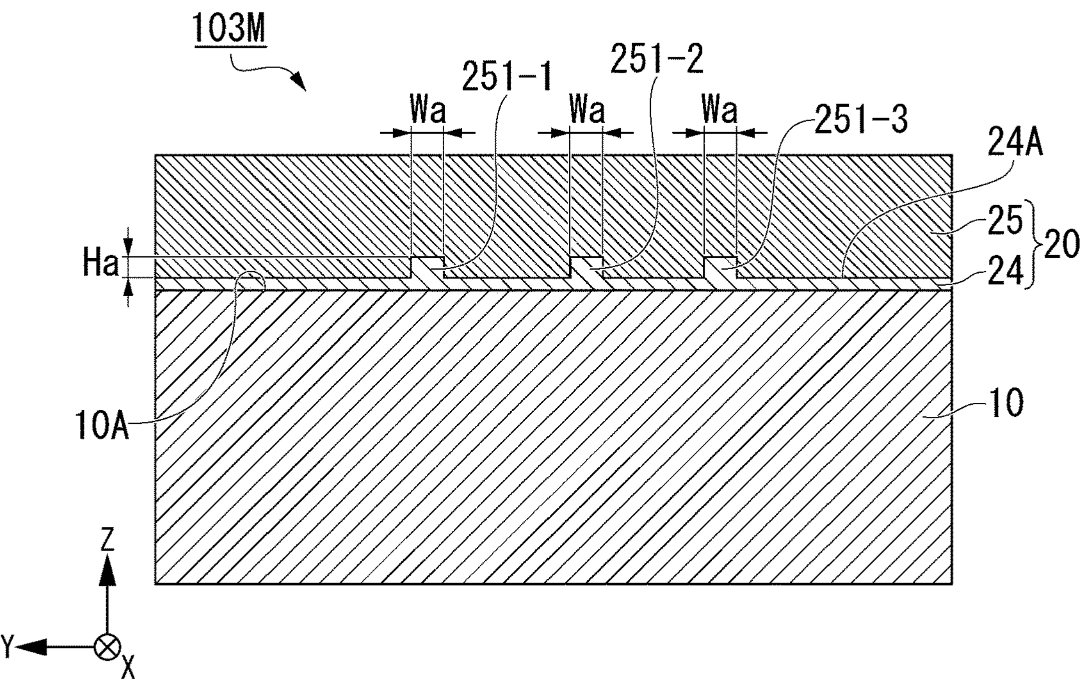
FIG. 8 is a schematic cross-sectional view of the optical coupling member shown in FIG. 7 taken along an YZ plane.

FIG. 7 is a schematic plan view of an optical coupling member 103M in which the Y-branch type optical coupler 103 shown in FIG. 3 is formed in an optical coupling functional layer made of lithium niobate, and FIG. 8 is a schematic cross-sectional view of the optical coupling member 103M taken along a YZ plane (X-X' in FIG. 7).

The optical coupling member 103M shown in FIG. 7 includes a substrate 10 made of a material different from lithium niobate, and an optical coupling functional layer 20 formed on a main surface of the substrate 10 and made of lithium niobate, and the Y-branch type optical coupler 103 is formed in the optical coupling functional layer 20.

The optical coupling member 103M shown in FIG. 7 includes a first optical input-side optical waveguide 221-1, a second optical input-side optical waveguide 221-2, and a third optical input-side optical waveguide 221-3 which are respectively connected to three optical incidence ports (a first light incidence port 221-1*i*, a second light incidence port 221-2*i*, and a third light incidence port 221-3*i*) provided in a first side surface 103A, and also includes an optical output-side optical waveguide 22 connected to one light emission port 220 provided in a third side surface 103C opposite to the first side surface 103A.

The first optical input-side optical waveguide 221-1 is connected to the input-side optical waveguide 251-1 connected to an optical coupling part 50, the second optical input-side optical waveguide 221-2 is connected to the input-side optical waveguide 251-2 connected to the optical coupling part 50, and the third optical input-side optical waveguide 221-3 is connected to the input-side optical waveguide 251-3 connected to the optical coupling part 50. Further, the optical output-side optical waveguide 22 is connected to an optical output-side optical waveguide 52 connected to the optical coupling part 50.

[Optical Coupling Member with Optical Modulation Function]

An optical coupling member with a light modulation function according to an embodiment of the present disclosure includes a substrate made of a material different from lithium niobate, and an optical coupling functional layer made of a lithium niobate film and formed on a main surface of the substrate, and the Y-branch type optical coupler according to the above embodiment and a Mach-Zehnder type optical modulator which is connected to the Y-branch type optical coupler and guides a plurality of lights emitted from a plurality of laser light sources to the Y-branch type optical coupler are integrated and formed in the optical coupling functional layer. Regarding constituent elements described below, the constituent elements having the same functions as those in the above embodiment may be designated by the same reference numerals, and a description thereof may be omitted.

Figure 9:
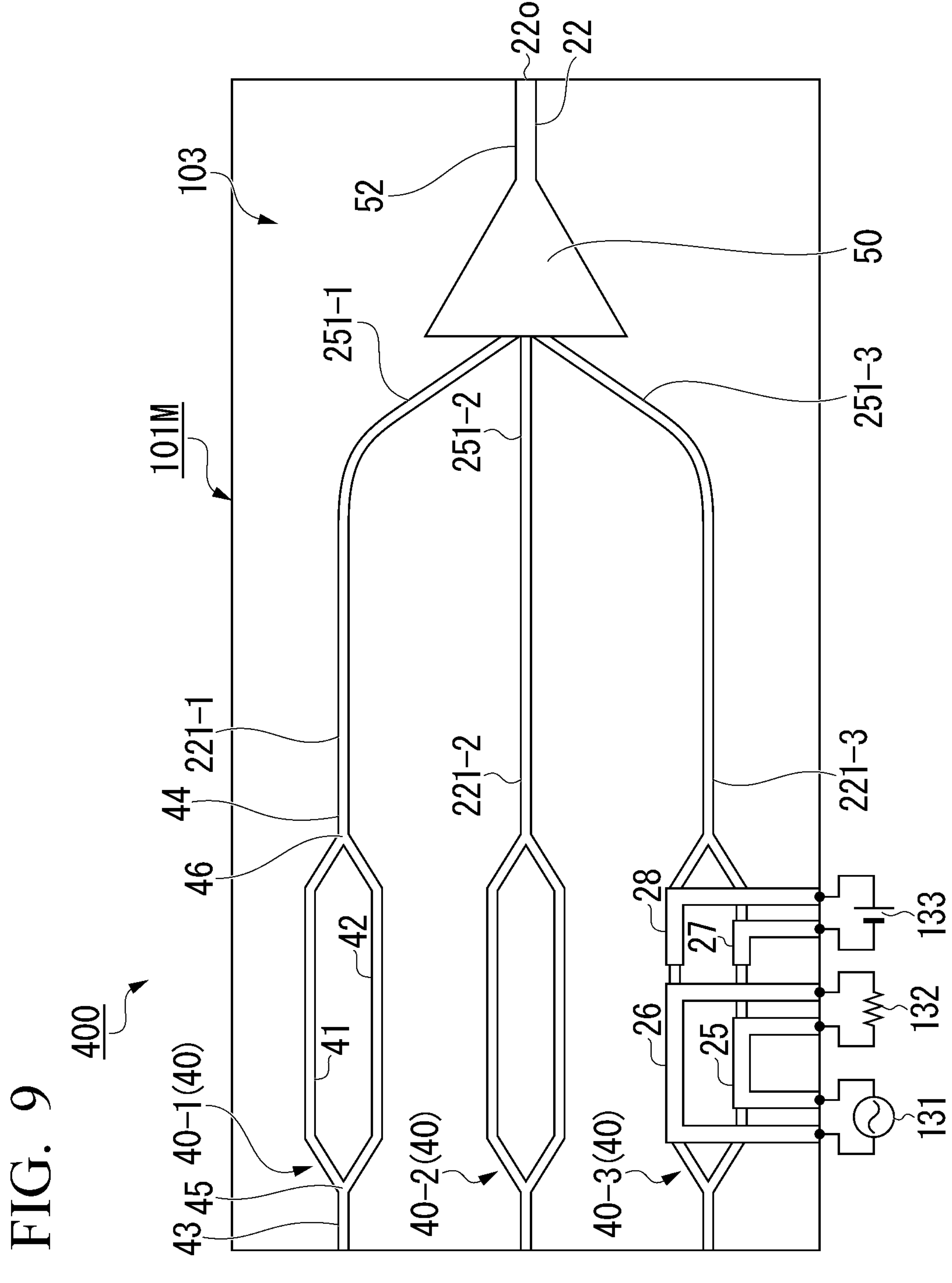
FIG. 9 is a schematic plan view of an optical coupling member with a light modulation function according to an embodiment of the present disclosure.

FIG. 9 is a schematic plan view of the optical coupling member with a light modulation function.

The optical coupling member 400 with a light modulation function shown in FIG. 9 includes a substrate 10 made of a material different from lithium niobate (refer to FIG. 8), and an optical coupling functional layer 20 made of a lithium niobate film and formed on a main surface of the substrate 10.

The optical coupling member 400 with a light modulation function includes the optical coupling member 103M (refer to FIG. 7) according to the embodiment described above and a Mach-Zehnder type optical modulator 40.

The Mach-Zehnder type optical modulator 40 includes three Mach-Zehnder type optical waveguides 40-1, 40-2 and 40-3, but two or four or more Mach-Zehnder type optical modulators 40 may be provided according to the number of input ports of the Y-branch type optical coupler 50.

The optical coupling member 400 with a light modulation function has a configuration in which the optical coupling member 103M shown in FIG. 7 is used as the optical coupling member, but may have a configuration in which other optical coupling members such as the optical coupling member 101M (refer to FIG. 4) and the optical coupling member 102M (refer to FIG. 6) are used instead of the optical coupling member 103M.

A known Mach-Zehnder type optical modulator or an optical waveguide may be used as the Mach-Zehnder type optical modulator 40, and a light beam in which a wavelength and a phase are aligned is split (decoupled) into two pairs of beams, each given a different phase, and then merged (coupled). The intensity of the coupled light beam changes according to a difference in phase difference.

Each of the Mach-Zehnder type optical waveguides 40 (40-1, 40-2 and 40-3) shown in FIG. 9 includes a first optical waveguide 41, a second optical waveguide 42, an input path 43, an output path 44, a branching part 45, and a coupling part 46.

The first output path 44 of the Mach-Zehnder type optical waveguide 40-1 is connected to the first optical input-side optical waveguide 221-1 connected to the first optical input-side optical waveguide 251-1 of the Y-branch type optical coupler 50. Further, the first output path 44 of the Mach-Zehnder type optical waveguide 40-2 is connected to the first optical input-side optical waveguide 221-2 connected to the second optical input-side optical waveguide 251-2 of the Y-branch type optical coupler 50. Further, the first output path 44 of the Mach-Zehnder type optical waveguide 40-3 is connected to the first optical input-side optical waveguide 221-3 connected to the second optical input-side optical waveguide 251-3 of the Y-branch type optical coupler 50.

Although the first optical waveguide 41 and the second optical waveguide 42 shown in FIG. 9 have a configuration in which they extend linearly in the x direction except for the vicinity of the branching part 45 and the vicinity of the coupling part 46, they are not limited to such a configuration. Lengths of the first optical waveguide 41 and the second optical waveguide 42 shown in FIG. 9 are approximately the same. The branching part 45 is located between the input path 43 and the first optical waveguide 41 and the second optical waveguide 42. The input path 43 is connected to the first optical waveguide 41 and the second optical waveguide 42 via the branching part 45. The coupling part 46 is located between the first optical waveguide 41 and the second optical waveguide 42 and the output path 44. The first optical waveguide 41 and the second optical waveguide 42 are connected to the output path 44 via the coupling part 46.

Electrodes 25 and 26 are electrodes that apply a modulation voltage to each of the Mach-Zehnder type optical waveguides 40-1, 40-2 and 40-3 (hereinafter, sometimes simply referred to as "each of the Mach-Zehnder type optical waveguides 40"). The electrode 25 is an example of a first electrode, and the electrode 26 is an example of a second electrode. One end of the electrode 25 is connected to a power source 131, and the other end is connected to a terminating resistor 132. One end of the electrode 26 is connected to the power source 131, and the other end is connected to the terminating resistor 132. The power source 131 is part of a drive circuit that applies a modulation voltage to each of the Mach-Zehnder type optical waveguides 40. The electrodes 25 and 26 are shown only in a portion of the Mach-Zehnder type optical waveguide 40-3 to simplify the drawing.

Electrodes 27 and 28 are electrodes that apply a DC bias voltage to each of the Mach-Zehnder type optical waveguides 40. One end of the electrode 27 and one end of the electrode 28 are connected to a power source 133. The power source 133 is part of a DC bias application circuit that applies a DC bias voltage to each of the Mach-Zehnder type optical waveguides 40.

When a DC bias voltage is superimposed on the electrodes 25 and 26, the electrodes 27 and 28 may not be provided. Further, a ground electrode may be provided around the electrodes 25, 26, 27 and 28.

[Light Source Module (First Embodiment)]

A light source module according to a first embodiment of the present disclosure includes the optical coupling member according to the above embodiment and a plurality of laser light sources which emit lights that are coupled by the optical coupling member.

Figure 10:
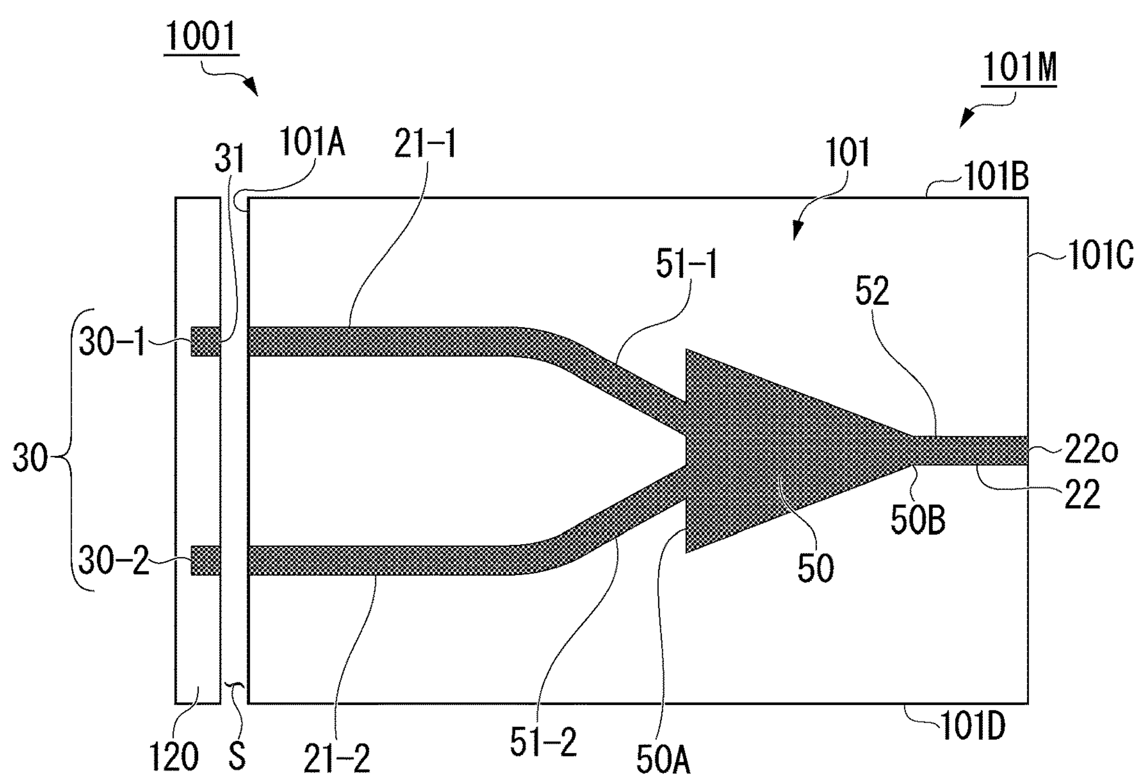
FIG. 10 is a schematic plan view of an example of a light source module according to a first embodiment.

FIG. 10 is a schematic plan view of the light source module according to the first embodiment. FIG. 10 shows an example of a light source module including the optical coupling member 101M shown in FIG. 4.

The laser light source may be a visible light laser light source. In this case, the light source module is a light source module of visible light.

A light source module 1001 shown in FIG. 10 includes the optical coupling member 101M including the Y-branch type optical coupler 50, and two laser light sources 30 (30-1 and 30-2) that emit lights to be coupled by the optical coupling member 101M. The optical coupling member 101M includes the substrate 10 (refer to FIG. 5) made of a material different from lithium niobate, and the optical coupling functional layer 20 (refer to FIG. 5) formed on the main surface of the substrate 10 and made of lithium niobate, and has a side surface 101A.

Regarding the constituent elements shown in FIG. 10, the constituent elements having the same functions as those described above may be designated by the same reference numerals, and a description thereof may be omitted.

Various laser elements can be used as the laser light source 30. For example, commercially available laser diodes (LDs) emitting red light, green light, blue light, and the like can be used. Light with a peak wavelength of 600 nm to 830 nm can be used as red light, light with a peak wavelength of 500 nm to 600 nm can be used as green light, and light with a peak wavelength of 380 nm to 500 nm can be used as blue light.

In the light source module 1001, the laser light sources 30-1 and 30-2 are two of, for example, an LD that emits green light, an LD that emits blue light, and an LD that emits red light. The LDs 30-1 and 30-2 are disposed at an interval from each other in a direction substantially perpendicular to an emission direction of light emitted from each of the LDs and are provided on an upper surface of a subcarrier 120.

In the light source module 1001, the case in which the number of laser light sources is two is exemplified, but the number is not limited to two as long as there is a plurality of laser light sources, and the number may be three or more. The plurality of laser light sources may all emit light of different wavelengths, or the plurality of laser light sources may emit light of the same wavelength. In addition, lights other than red (R), green (G), and blue (B) can be used for the emitted light, and a mounting order of red (R), green (G), and blue (B) described using the drawings is not necessarily in this order and can be changed as appropriate.

The LD 30 can be mounted on the subcarrier 120 as a bare chip. The subcarrier 120 is made of, for example, aluminum nitride (AlN), aluminum oxide ($Al_2O_3$), silicon (Si), or the like.

The subcarrier 120 may be directly bonded to the substrate 10 via a metal bonding layer. With such a configuration, further miniaturization is possible by not performing spatial coupling or fiber coupling.

A relative position between the subcarrier 120 and the substrate 10 can be adjusted during manufacturing by configuring the subcarrier 120 and the substrate 10 to be bonded via the metal bonding layer, and alignment of a position of an optical axis of laser light can be performed so that the optical axis of each optical laser matches respective axes of the first optical input-side optical waveguide 21-1, the second optical input-side optical waveguide 21-2, and the third optical input-side optical waveguide 21-3 (active alignment).

In the light source module 1001, the first optical input-side optical waveguide 21-1 and the second optical input-side optical waveguide 21-2 that are respectively connected to the two optical input-side optical waveguides 51-1 and 51-2 of the Y-branch type optical coupler 50 face the emission port of each of the LDs 30 (30-1 and 30-2), and are positioned so that the light emitted from an emission surface of each of the LDs 30 can be incident on the first optical input-side optical waveguide 21-1 and the second optical input-side optical waveguide 21-2. The respective axes of the first optical input-side optical waveguide 21-1 and the second optical input-side optical waveguide 21-2 approximatively overlap the optical axis of the laser light emitted from the emission port of each of the LDs 30. Due to such a configuration and arrangement, light such as blue light, green light, and red light emitted from the LDs 30-1 and 30-2 can be incident on the two first optical input-side optical waveguides 21-1 and second optical input-side optical waveguide 21-2 of the Y-branch type optical coupler 50.

In the light source module 1001, a light emission surface 31 of the LD 30 and a light incidence surface (a side surface) 101A of the optical coupling member 101M are disposed at a predetermined interval. The light incidence surface 101A faces the light emission surface 31, and there is a gap S between the light emission surface 31 and the light incidence surface 101A in the x direction. Since the light source module 1001 is exposed to air, the gap S is filled with air. Since the gap S is filled with the same gas (air), it is easy to make each color light emitted from each of the LDs 30 be incident on an incidence path in a state in which a predetermined coupling efficiency is satisfied. When the light source module 1001 is used for AR glasses or VR glasses, a size of the gap (interval) S in the x direction is, for example, larger than 0 μm and smaller than 5 μm, considering an amount of light required for the AR glasses or VR glasses.

Figure 11:
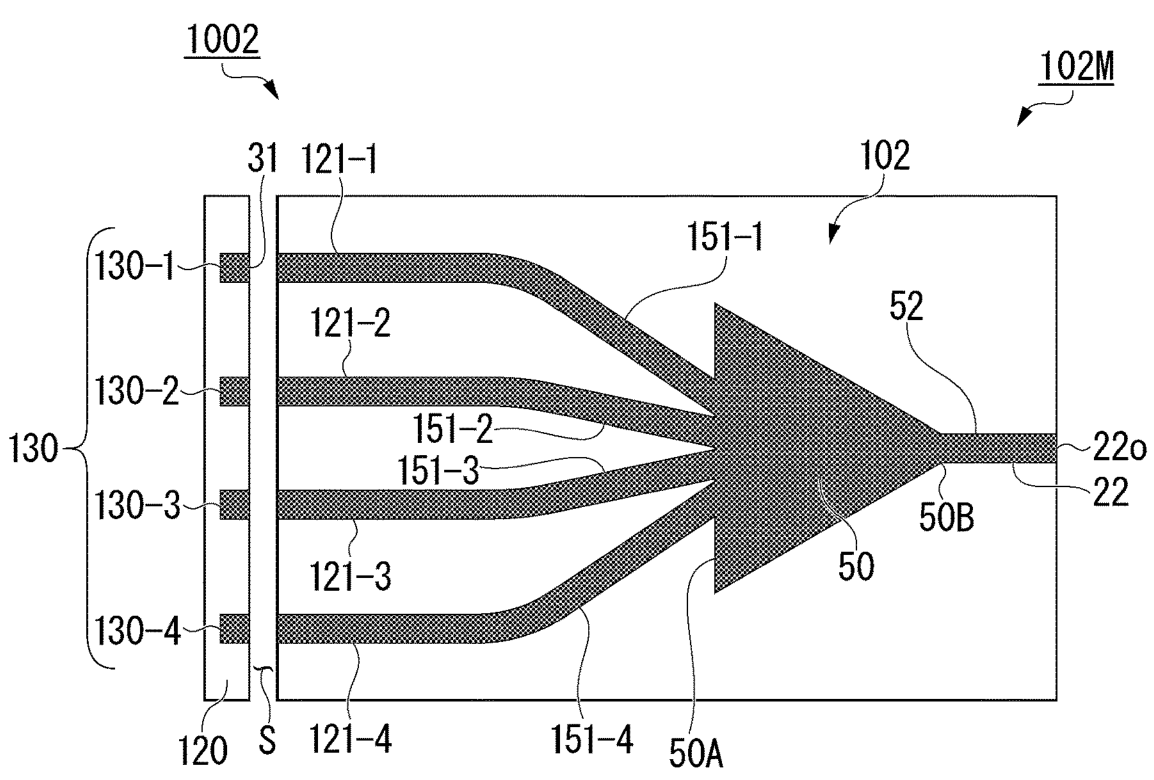
FIG. 11 is a schematic plan view of another example of the light source module according to the first embodiment.

FIG. 11 is a schematic plan view of a light source module including the optical coupling member 101M shown in FIG. 6.

The light source module 1002 shown in FIG. 11 includes an optical coupling member 102M including a Y-branch type optical coupler 50, and four laser light sources 130 (130-1, 130-2, 130-3 and 130-4) that emit lights to be coupled by the optical coupling member 102M. The optical coupling member 102M includes a substrate 10 (refer to FIG. 5) made of a material different from lithium niobate, and an optical coupling functional layer 20 (refer to FIG. 5) formed on a main surface of the substrate 10 and made of lithium niobate.

Regarding the constituent elements shown in FIG. 11, the constituent elements having the same functions as those described above may be designated by the same reference numerals, and a description thereof may be omitted.

The laser light source may be a visible light laser light source. In this case, the light source module is a light source module of visible light.

Various laser elements can be used as the laser light source 130. For example, commercially available laser diodes (LDs) emitting red light, green light, blue light, and the like can be used.

In the light source module 1002, each of the laser light sources 130-1, 130-2, 130-3 and 130-4 is, for example, any four of LDs that emit green light, LDs that emit blue light and LDs that emit red light. The LDs 130-1, 130-2, 130-3 and 130-4 are disposed to be spaced apart from each other at intervals in a direction substantially perpendicular to the emission direction of light emitted from each of the LDs and are provided on the upper surface of the subcarrier 120.

In the light source module 1002, the first optical input-side optical waveguide 121-1, the second optical input-side optical waveguide 121-2, the third optical input-side optical waveguide 121-3 and the fourth optical input-side optical waveguide 121-4 that are respectively connected to the four optical input-side optical waveguides 51-1 and 51-2 of the Y-branch type optical coupler 50 respectively face the emission ports of the LDs 130 (130-1, 130-2, 130-3 and 130-4), and are positioned so that the light emitted from the emission surface of each of the LDs 130 can be incident on the first optical input-side optical waveguide 121-1, the second optical input-side optical waveguide 121-2, the third optical input-side optical waveguide 121-3 and the fourth optical input-side optical waveguide 121-4. The respective axes of the first optical input-side optical waveguide 121-1, the second optical input-side optical waveguide 121-2, the third optical input-side optical waveguide 121-3 and the fourth optical input-side optical waveguide 121-4 substantially overlap the optical axis of the laser light emitted from the emission port of each of the LDs 130. With such a configuration and arrangement, light such as blue light, green light, and red light emitted from the LDs 130-1, 130-2, 130-3 and 130-4 can be incident on the four first optical input-side optical waveguide 121-1, second optical input-side optical waveguide 121-2, third optical input-side optical waveguide 121-3 and fourth optical input-side optical waveguide 121-4 of the Y-branch type optical coupler 50.

Figure 12:
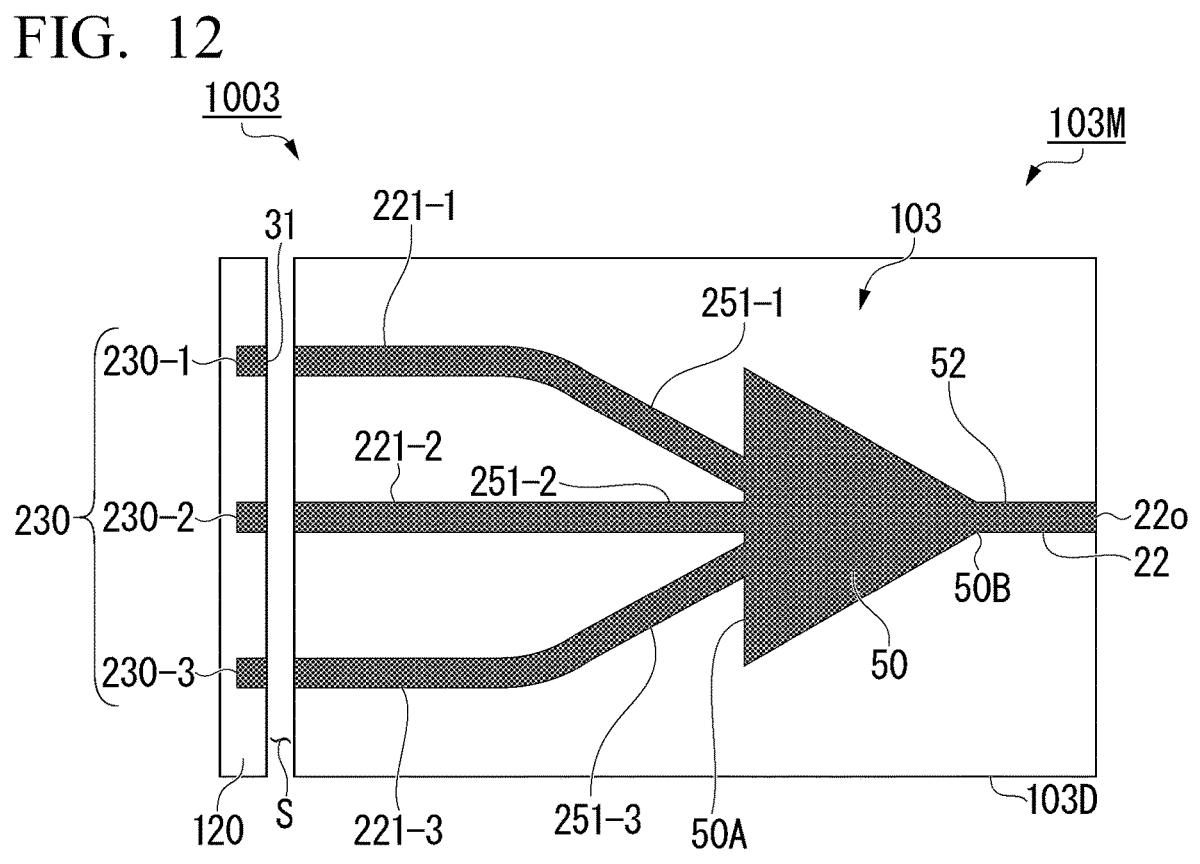

FIG. 12 is a schematic plan view of a light source module including the optical coupling member 103M shown in FIG. 7.

The light source module 1003 shown in FIG. 12 includes the optical coupling member 103M including the Y-branch type optical coupler 50, and three laser light sources 230 (230-1, 230-2 and 230-3) that emit lights to be coupled by the optical coupling member 103M. The optical coupling member 103M includes a substrate 10 (refer to FIG. 7) made of a material different from lithium niobate, and an optical coupling functional layer 20 (refer to FIG. 7) formed on a main surface of the substrate 10 and made of lithium niobate.

Regarding the constituent elements shown in FIG. 12, constituent elements having the same functions as those described above may be designated by the same reference numerals, and a description thereof may be omitted.

The laser light source may be a visible light laser light source. In this case, the light source module is a light source module of visible light.

Various laser elements can be used as the laser light source 230. For example, commercially available laser diodes (LDs) emitting red light, green light, blue light, and the like can be used.

In the light source module 1003, each of the laser light sources 230-1, 230-2 and 230-3 is, for example, any one of an LD that emits green light, an LD that emits blue light or an LD that emits red light. The LDs 230-1, 230-2 and 230-3 are disposed to be spaced apart from each other at intervals in a direction substantially perpendicular to the emission direction of light emitted from each of the LDs, and are provided on the upper surface of the subcarrier 120.

In the light source module 1003, the first optical input-side optical waveguide 221-1, the second optical input-side optical waveguide 221-2 and the third optical input-side optical waveguide 221-3 that are respectively connected to the three optical input-side optical waveguides 51-1 and 51-2 of the Y-branch type optical coupler 50 respectively face the emission port of the LDs 230 (230-1, 230-2, 230-3), and are positioned so that the light emitted from the emission surface of each of the LDs 230 can be incident on the first optical input-side optical waveguide 221-1, the second optical input-side optical waveguide 221-2 and the third optical input-side optical waveguide 221-3. The respective axes of the first optical input-side optical waveguide 221-1, the second optical input-side optical waveguide 221-2 and the third optical input-side optical waveguide 221-3 substantially overlap the optical axis of the laser light emitted from the emission port of each of the LDs 230. With such a configuration and arrangement, light such as the blue light, green light, red light, and the like emitted from the LDs 230-1, 230-2 and 230-3 can be incident on the four first optical input-side optical waveguides 221-1, second optical input-side optical waveguides 221-2 and third optical input-side optical waveguides 221-3 of the Y-branch type optical coupler 50.

[Light Source Module (Second Embodiment)]

Figure 13:
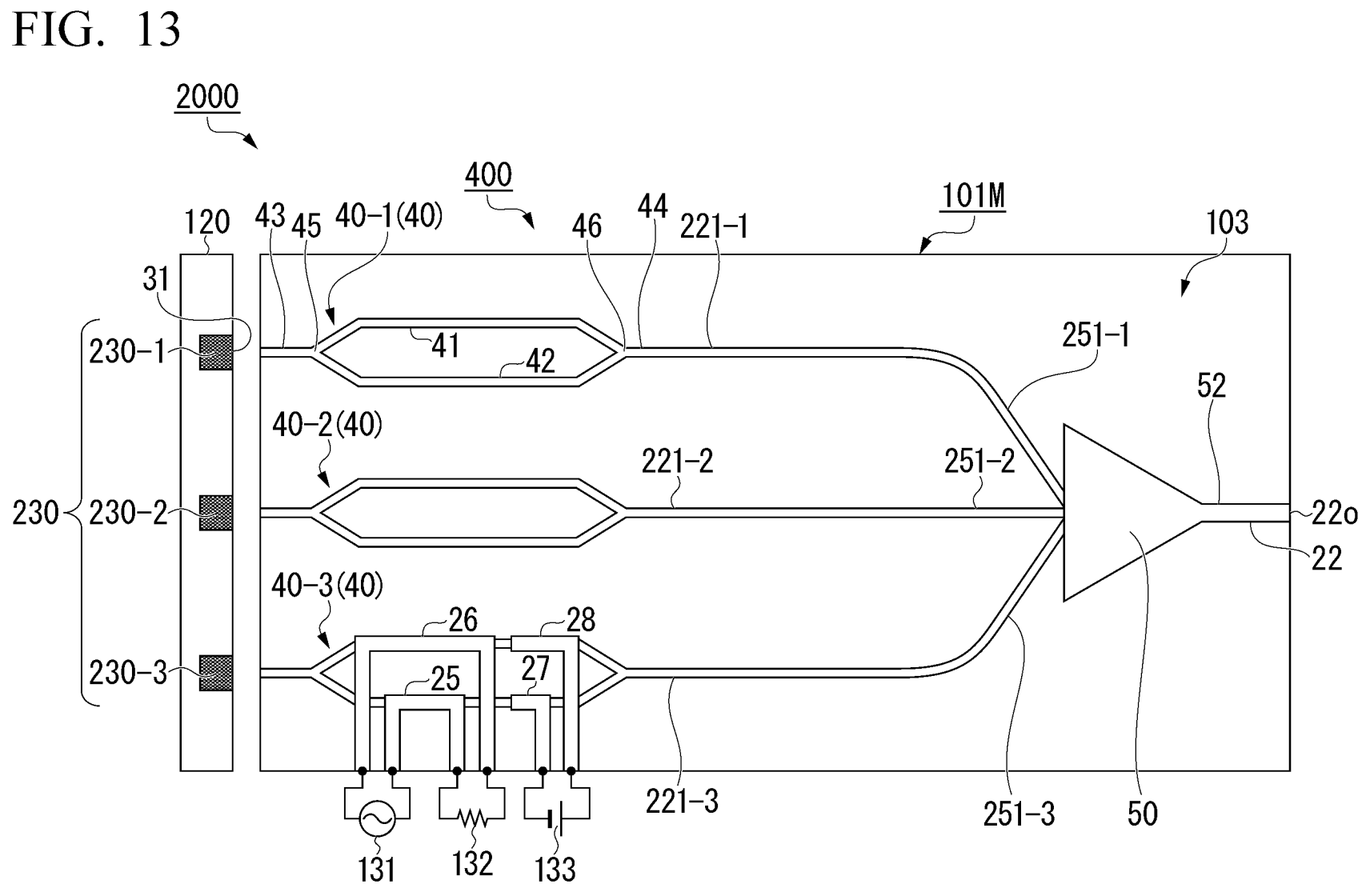

FIG. 13 is a schematic plan view of a light source module according to a second embodiment.

The light source module 2000 shown in FIG. 13 includes the optical coupling member 400 with a light modulation function shown in FIG. 9 and a plurality of laser light sources 230 (230-1, 230-2 and 230-3) that emit lights to be coupled by the optical coupling member 400 with a light modulation function. The optical coupling member 400 includes a substrate 10 (refer to FIG. 8) made of a material different from lithium niobate, and an optical coupling functional layer 20 (refer to FIG. 8) formed on a main surface of the substrate 10 and made of lithium niobate.

Regarding the constituent elements shown in FIG. 13, constituent elements having the same functions as those described above may be designated by the same reference numerals, and a description thereof may be omitted.

The laser light source may be a visible light laser light source.

The light source module 2000 includes three Mach-Zehnder type optical waveguides 40-1, 40-2 and 40-3 of which the number is the same as that of the laser light sources 230-1, 230-2 and 230-3. The laser light sources 230-1, 230-2 and 230-3 and the Mach-Zehnder type optical waveguides 40-1, 40-2 and 40-3 are positioned so that light emitted from each of the laser light sources is incident on the corresponding Mach-Zehnder type optical waveguide.

The subcarrier 120 on which the laser light sources 230-1, 230-2 and 230-3 are mounted and the substrate 10 on which the optical coupling functional layer 20 having the optical coupling member 400 with a light modulation function is formed can be directly bonded via a metal bonding layer. With such a configuration, further miniaturization is possible by not performing spatial coupling or fiber coupling.

In addition, a relative position between the subcarrier 120 and the substrate 10 is adjusted during manufacturing, and alignment of the position of the optical axis of the laser light can be performed so that the optical axis of each optical laser matches the axis of each of the input paths 43 of the Mach-Zehnder type optical waveguides 40-1, 40-2 and 40-3 (active alignment).

A size of the optical coupling functional layer 20 is, for example, 100 $mm^2$ or less. When the size of the optical coupling functional layer 20 is 100 $mm^2$ or less, it is suitable for use in xR glasses such as AR glasses and VR glasses.

The optical coupling functional layer 20 can be produced by a known method. For example, the optical coupling functional layer 20 is manufactured using a semiconductor process such as epitaxial growth, photolithography, etching, vapor phase growth, and metallization.

When the light source module according the present disclosure is applied as xR glasses such as AR glasses and VR glasses, the width of the optical coupling part constituting the Y-branch type optical coupler is preferably about 1 to 1000 μm, and the length thereof is preferably about 10 to 10000 μm, for example.

For example, in a retinal projection display, in order to display an image in a desired color, it is necessary to independently and quickly modulate an intensity of each of three colors of RGB representing light. When such modulation is performed only on a laser light source (current modulation), a load on an IC that controls the modulation will become large, but modulation (voltage modulation) by the Mach-Zehnder type optical modulator 40 (the optical coupling member 400 with an optical modulation function) can also be used. In this case, coarse adjustment may be performed using a current (the laser light source), and fine adjustment may be performed using a voltage (the Mach-Zehnder type optical modulator 40), and also the coarse adjustment may be performed using the voltage (the Mach-Zehnder type optical modulator 40), and the fine adjustment may be performed using the current (the laser light source). Preferably, since it is better to make fine adjustments using the voltage, when responsiveness is important, the former is adopted, and since performing fine adjustment using a current requires a lower current and thus curbs power consumption, when curbing power consumption is important, the latter is adopted.

[Optical Engine]

In the specification, an optical engine is a device including a plurality of light sources, an optical system including a coupling part that couples a plurality of lights emitted from the plurality of light sources into one light, and a light scanning mirror that reflects the light emitted from the optical system by changing an angle so as to display an image, and a control element that controls the light scanning mirror.

Figure 14:
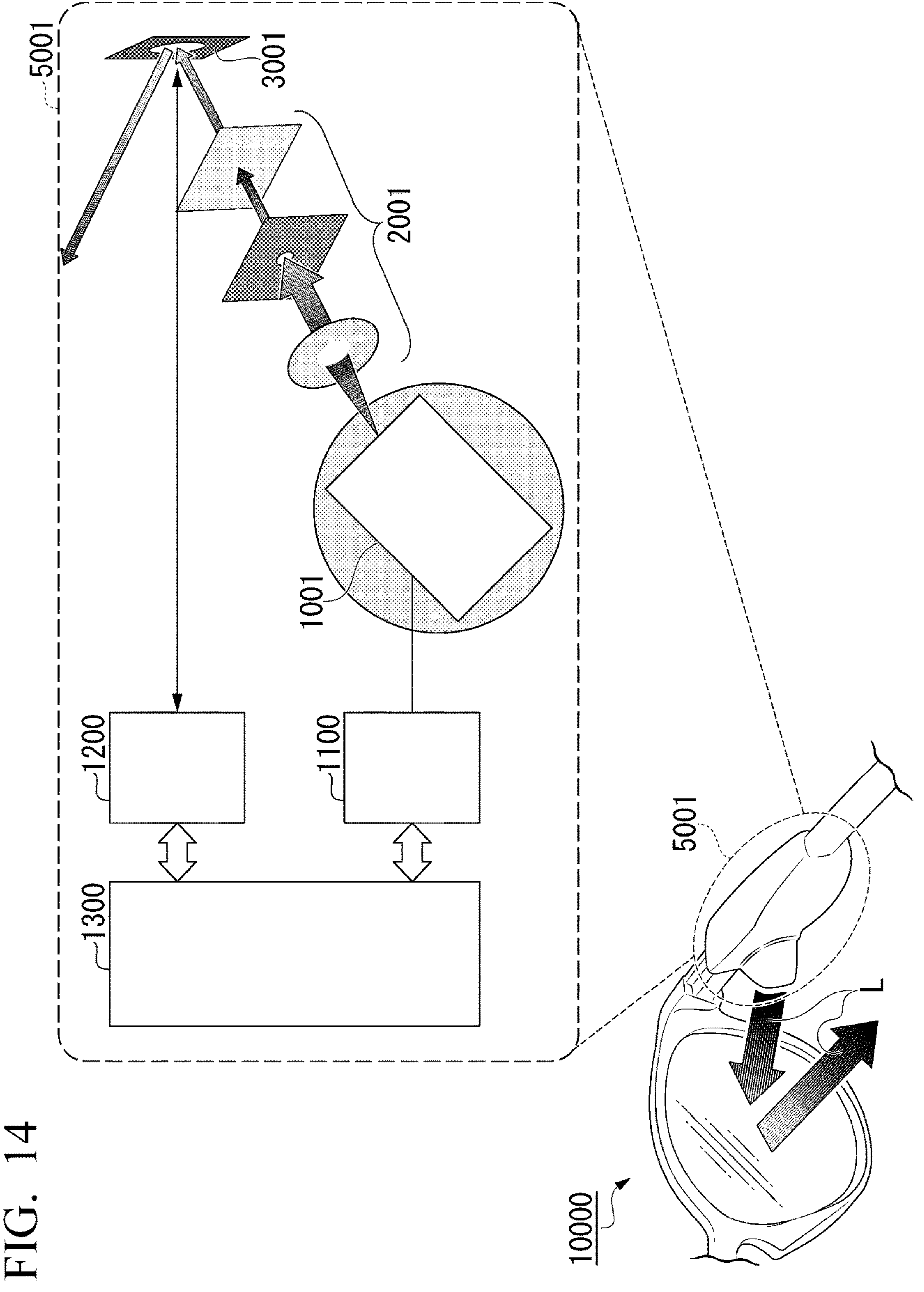
FIG. 14 is a conceptual diagram showing an optical engine according to the embodiment.

FIG. 14 shows a conceptual diagram showing an optical engine 5001 according to this embodiment. The drawing shows a state in which the optical engine 5001 is installed in a frame 10010 of glasses 10000. Symbol Lis image display light.

The optical engine 5001 includes a light source module 1001 and a light scanning mirror 3001. As the light source module 1001 included in the optical engine 5001, the light source module according to the embodiment described above is used. The light source module may be a light source module of visible light.

As the light source module, in place of the light source module 1001, a light source module 1002, a light source module 1003, a light source module 2000, or any other light source module according to the present disclosure can be used.

Laser light emitted from the light source module 1001 installed in a glasses frame is reflected and scanned by the light scanning mirror, enters the human eye, and an image (a video) is directly projected onto the retina.

The light scanning mirror 3001 is, for example, a MEMS mirror. In order to project a 2D image, it is preferably a two-axis MEMS mirror that vibrates to reflect laser light while an angle thereof is changed in a horizontal direction (an X direction) and a vertical direction (a Y direction).

The optical engine 5001 includes a collimator lens 2001_a_, a slit 2001_b_, and an ND filter 2001_c_ as an optical system that optically processes the laser light emitted from the light source module 1001. This optical system is just an example, and other configurations may be used.

The optical engine 5001 includes a laser driver 1100, a light scanning mirror driver 1200, and a video controller 1300 that controls the drivers.

EXAMPLES

Hereinafter, the present disclosure will be described in more detail using examples. However, the present disclosure is not limited to the examples shown below. Therefore, although visible light is used in the following examples, the present disclosure is not limited to visible light.

Examples 1-1 to 1-4 (Win=Wout)

Figure 15A:
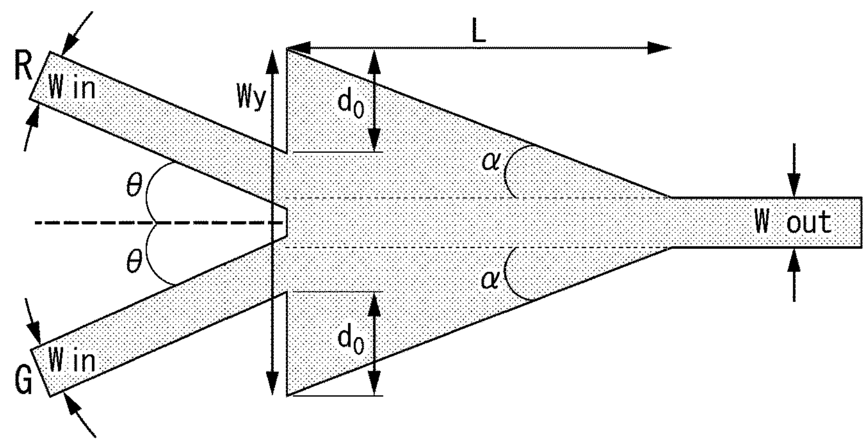
FIG. 15A is a schematic plan view showing a model of the Y-branch type optical coupler used in simulation for Example 1-1.
Figure 15B:
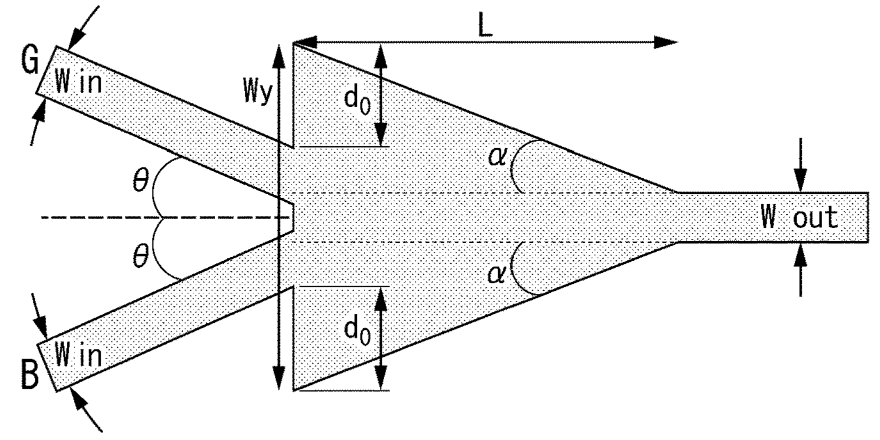
FIG. 15B is a schematic plan view showing a model of the Y-branch type optical coupler used in the simulation for Example 1-2.
Figure 15C:
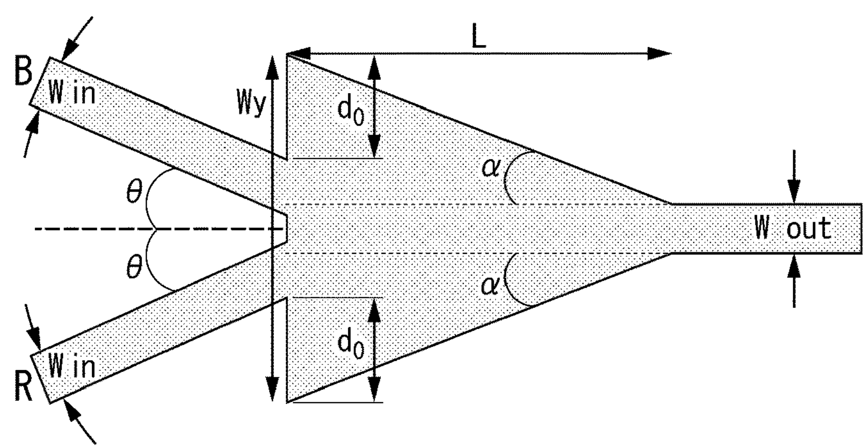
FIG. 15C is a schematic plan view showing a model of the Y-branch type optical coupler used in the simulation for Example 1-3.
Figure 15D:
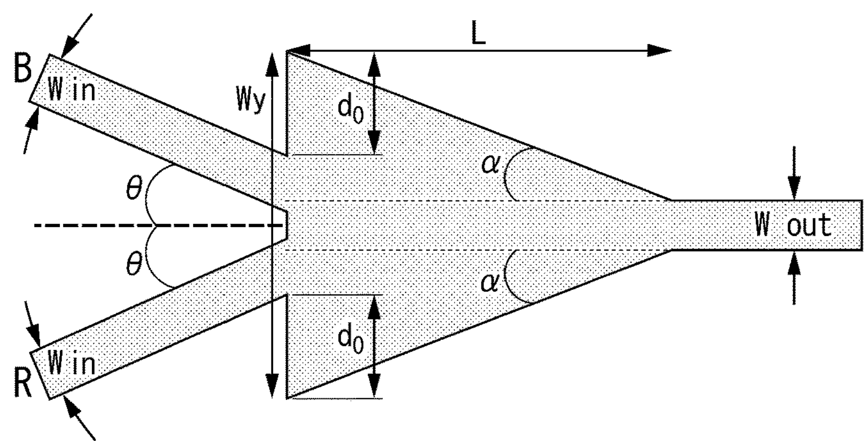
FIG. 15D is a schematic plan view showing a model of the Y-branch type optical coupler used in the simulation for Example 1-2.

Examples 1-1 to 1-4 are configurations of the Y-branch type optical coupler shown in FIG. 1, but the dimensions, angles, and wavelengths of visible light to be coupled are changed. FIGS. 15A to 15D show the configurations of Examples 1-1 to 1-4, respectively. Examples 1-1 to 1-4 are cases in which the width of the input-side optical waveguide and the width of the output-side optical waveguide are equal. That is, FIG. 15A shows the configuration of Example 1-1, FIG. 15B shows the configuration of Example 1-2, FIG. 15C shows the configuration of Example 1-3, and FIG. 15D shows the configuration of Example 1-4.

Table 1 shows results of a simulation of propagation loss (dB) of each visible light of RGB. Fimmwave (Photon Design Co.) was used as simulation software.

TABLE 1

| | Branching length L (μm) | Input/output width Win = Wout (μm) | End portion $d_0$ (μm) | Width of coupling part Wy (μm) | Incidence angle θ (degree) | Emission angle α (degree) | Coupling loss R (dB) | Coupling loss G (dB) | Coupling loss B (dB) | 2 Input | |
|---|---|---|---|---|---|---|---|---|---|---|---|
| Example 1-1 | 167 | 0.7 | 1 | 3.4 | 2 | 0.5 | 5 | 5 | — | RG | $\theta > \alpha$ |
| Example 1-2 | 233 | 0.7 | 1 | 3.4 | 2 | 0.3 | — | 5 | 5 | GB | $\theta > \alpha$ |
| Example 1-3 | 303 | 0.7 | 1 | 3.4 | 2 | 0.3 | 5 | — | 5 | BR | $\theta > \alpha$ |
| Example 1-4 | 6 | 0.7 | 1 | 3.4 | 2 | 12.7 | 5 | 5 | — | BR | $\theta > \alpha$ |

In all of Examples 1-1 to 1-4, the coupling loss of each visible light was 5 dB. Since the coupling loss is preferably 10 dB or less, it was good.

Examples 2-1 to 2-4 (Win=Wout)

Figure 16A:
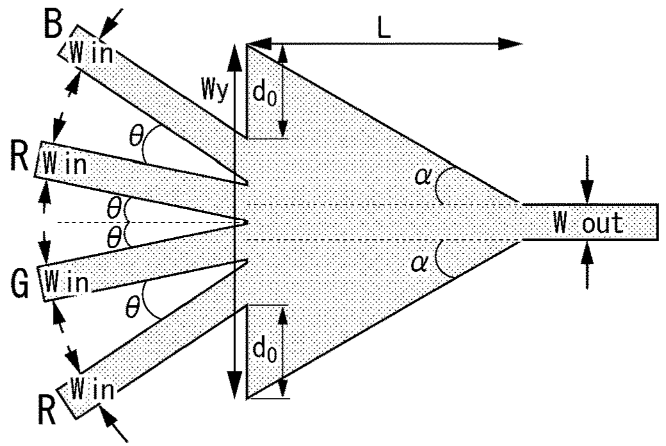
FIG. 16A is a schematic plan view showing a model of the Y-branch type optical coupler used in simulation for Example 2-1.
Figure 16B:
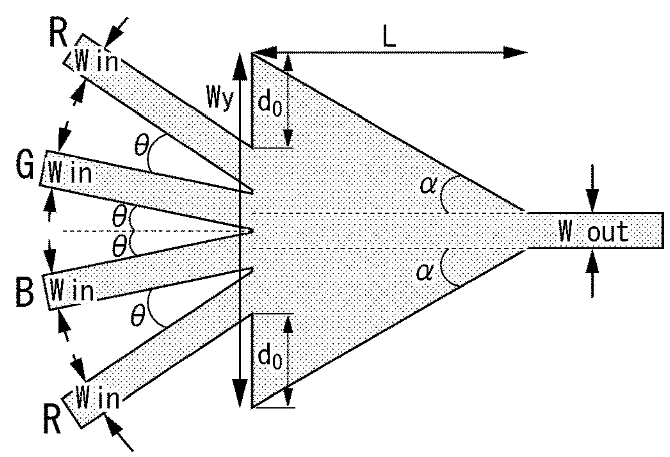
FIG. 16B is a schematic plan view showing a model of the Y-branch type optical coupler used in the simulation for Example 2-2.
Figure 16C:
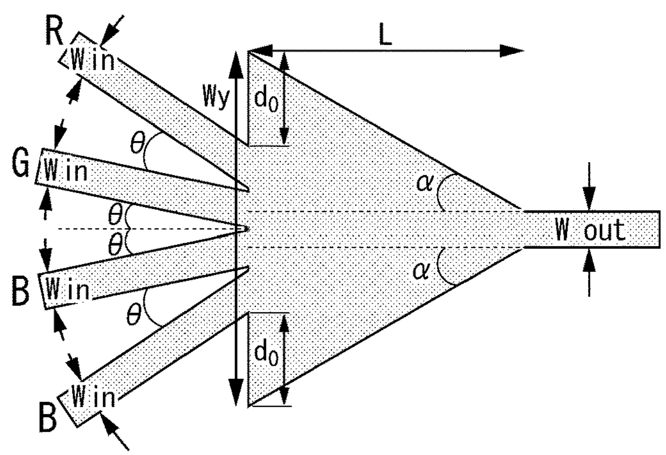
FIG. 16C is a schematic plan view showing a model of the Y-branch type optical coupler used in the simulation for Example 2-3.
Figure 16D:
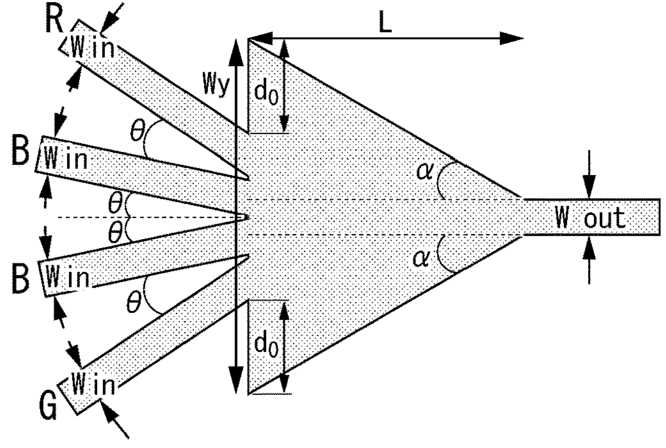
FIG. 16D is a schematic plan view showing a model of the Y-branch type optical coupler used in the simulation for Example 2-4.

Examples 2-1 to 2-4 are configurations of the Y-branch type optical coupler shown in FIG. 2, but the dimensions, angles, and wavelengths of visible light to be coupled are changed. FIGS. 16A to 16D show the configurations of Examples 2-1 to 2-4, respectively. Examples 2-1 to 2-4 are cases in which the width of the input-side optical waveguide and the width of the output-side optical waveguide are equal. That is, FIG. 16A shows the configuration of Example 2-1, FIG. 16B shows the configuration of Example 2-2, FIG. 16C shows the configuration of Example 2-3, and FIG. 16D shows the configuration of Example 2-4.

Table 2 shows results of a simulation of the propagation loss (dB) of each visible light of RGB.

TABLE 2

| | Branching length L (μm) | Input/output width Win = Wout (μm) | End portion $d_0$ (μm) | Width of coupling part Wy (μm) | Incidence angle θ (degree) | Emission angle α (degree) | Coupling loss 1 (dB) | Coupling loss 2 (dB) | Coupling loss 3 (dB) | Coupling loss 4 (dB) | 4 Input |
|---|---|---|---|---|---|---|---|---|---|---|---|
| Example 2-1 | 238 | 0.7 | 1 | 4.8 | 2 | 0.5 | 7 | 8 | 8 | 8 | 1:2:3:4 = B:R:G:R, $\theta > \alpha$ |
| Example 2-2 | 16 | 0.7 | 1 | 4.8 | 2 | 7.3 | 8 | 8 | 7 | 7 | 1:2:3:4 = R:G:B:R, $\theta < \alpha$ |
| Example 2-3 | 21 | 0.7 | 1 | 4.8 | 2 | 5.6 | 5 | 6 | 9 | 7 | 1:2:3:4 = R:G:B:B, $\theta < \alpha$ |
| Example 2-4 | 121 | 0.7 | 1 | 4.8 | 2 | 1.0 | 8 | 9 | 9 | 8 | 1:2:3:4 = R:B:B:G, $\theta > \alpha$ |

In all of Examples 2-1 to 2-4, the coupling loss of each visible light was 7 to 9 dB. Since the coupling loss is preferably 10 dB or less, it was good.

Examples 3-1 to 3-4 (Win=Wout)

Figure 17A:
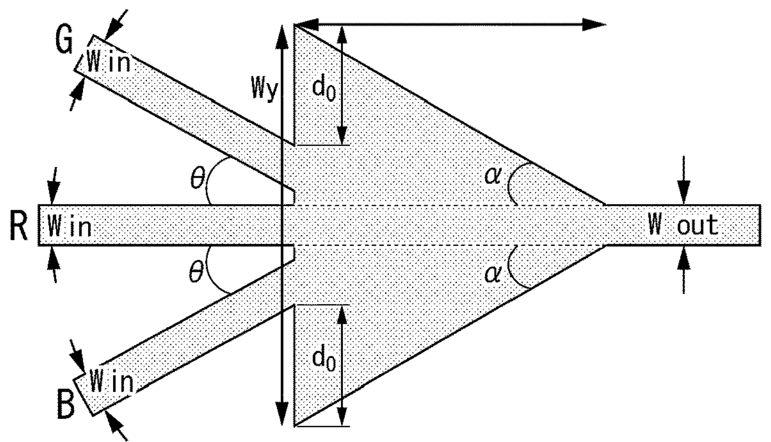
FIG. 17A is a schematic plan view showing a model of the Y-branch type optical coupler used in simulation for Example 3-1.
Figure 17B:
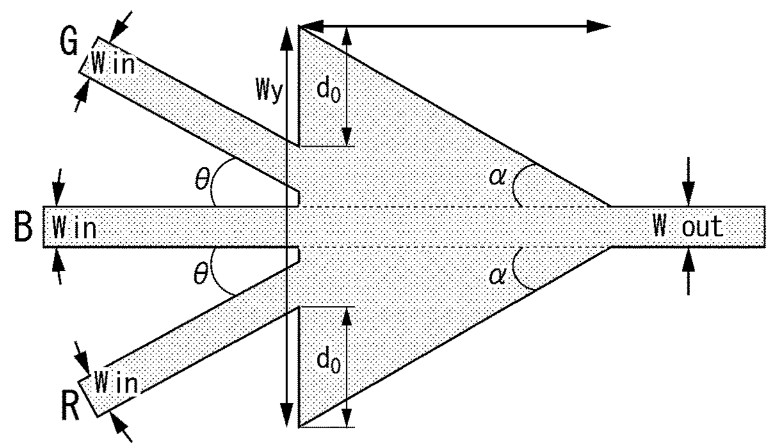
FIG. 17B is a schematic plan view showing a model of the Y-branch type optical coupler used in the simulation for Example 3-2.
Figure 17C:
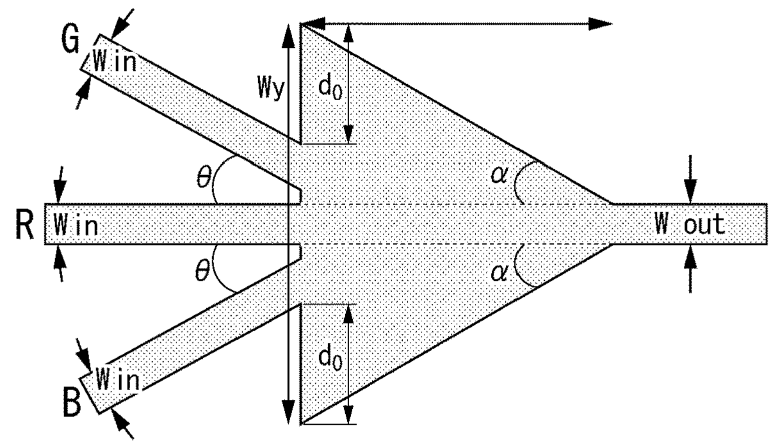
FIG. 17C is a schematic plan view showing a model of the Y-branch type optical coupler used in the simulation for Example 3-3.
Figure 17D:
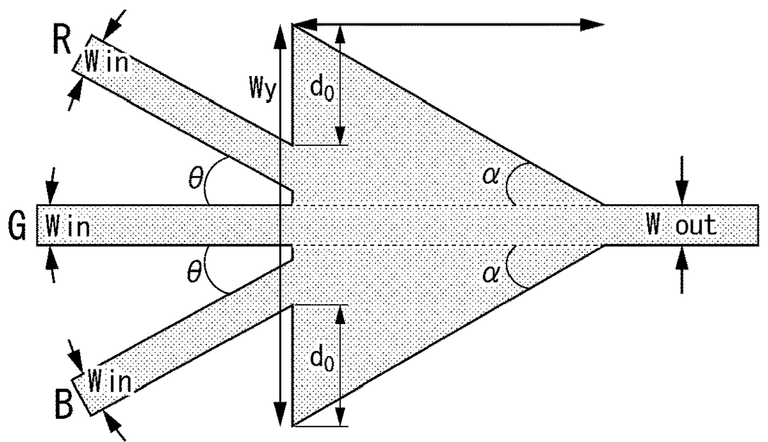
FIG. 17D is a schematic plan view showing a model of a Y-branch type optical coupler used in the simulation for Example 3-4.

Examples 3-1 to 3-4 are the configurations of the Y-branch type optical coupler shown in FIG. 3, but the dimensions, angles, and wavelengths of visible light to be coupled are changed. FIGS. 17A to 17D show the configurations of Examples 3-1 to 3-4, respectively. Examples 3-1 to 3-4 are cases in which the width of the input-side optical waveguide and the width of the output-side optical waveguide are equal. That is, FIG. 17A shows the configuration of Example 3-1, FIG. 17B shows the configuration of Example 3-2, FIG. 17C shows the configuration of Example 3-3, and FIG. 17D shows the configuration of Example 3-4.

Table 3 shows results of a simulation of the propagation loss (dB) of each visible light of RGB.

TABLE 3

| | Branching length L (μm) | Input/output width Win = Wout (μm) | End portion $d_0$ (μm) | Width of coupling part Wy (μm) | Incidence angle θ (degree) | Emission angle α (degree) | Coupling loss R (dB) | Coupling loss G (dB) | Coupling loss B (dB) | 3 Input | |
|---|---|---|---|---|---|---|---|---|---|---|---|
| Example 3-1 | 11 | 0.7 | 0.5 | 3.1 | 2 | 6.2 | 7 | 5 | 5 | R | G:R:B, θ < α |
| Example 3-2 | 11 | 0.7 | 0.5 | 3.1 | 2 | 6.2 | 5 | 4 | 7 | B | G:B:R, θ < α |
| Example 3-3 | 21 | 0.7 | 1 | 4.1 | 1.5 | 4.6 | 4 | 4 | 4 | R | G:R:B, θ < α |
| Example 3-4 | 9 | 0.7 | 1 | 4.1 | 1.5 | 11 | 4 | 4 | 6 | G | R:G:B, θ < α |

Comparative Examples 1 to 4 (Win=Wout)

Comparative Examples 1 to 4 are the configurations of the Y-branch type optical coupler shown in FIG. 3, but the dimensions, angles, and wavelengths of visible light to be coupled are changed. Comparative Examples 1 to 4 are cases in which the width of the input-side optical waveguide and the width of the output-side optical waveguide are equal.

Table 4 shows results of a simulation of the propagation loss (dB) of each visible light of RGB.

TABLE 4

| | Branching length L (μm) | Input/output width Win = Wout (μm) | End portion $d_0$ (μm) | Width of coupling part Wy (μm) | Incidence angle θ (degree) | Emission angle α (degree) | Coupling loss R (dB) | Coupling loss G (dB) | Coupling loss B (dB) | Center | |
|---|---|---|---|---|---|---|---|---|---|---|---|
| Comparative example 1 | 290 | 0.7 | 0 | 2.1 | 16 | 0.1 | 9 | 12 | 5 | B | θ > 15 |
| Comparative example 2 | 20 | 0.7 | 0 | 2.1 | 2 | 2 | 6 | 14 | 2 | B | θ = α |
| Comparative example 3 | 36 | 0.7 | 0.5 | 3.1 | 2 | 2 | 10 | 5 | 12 | G | θ = α |
| Comparative example 4 | 97 | 0.7 | 2.5 | 7.1 | 2.5 | 1.9 | 11 | 12 | 11 | B | $d_0$ > 2 |

In all of Comparative Examples 1 to 4, there is visible light exceeded 10 dB in RGB coupling loss.

Examples 4-1 to 4-4 (Win≠Wout)

Figure 18A:
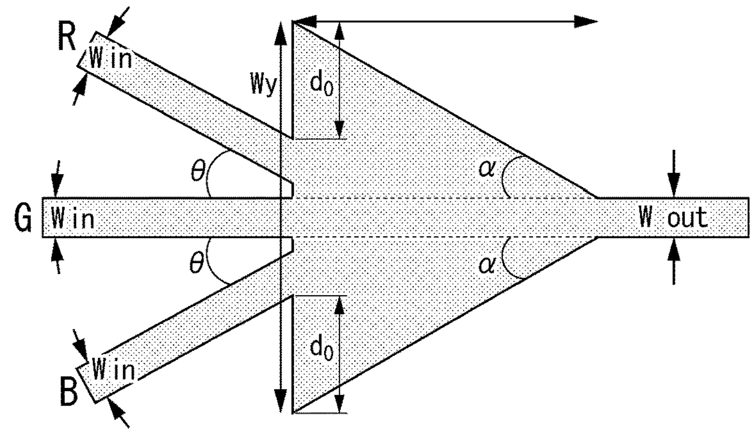
FIG. 18A is a schematic plan view showing a model of the Y-branch type optical coupler used in simulation for Example 5-1.
Figure 18B:
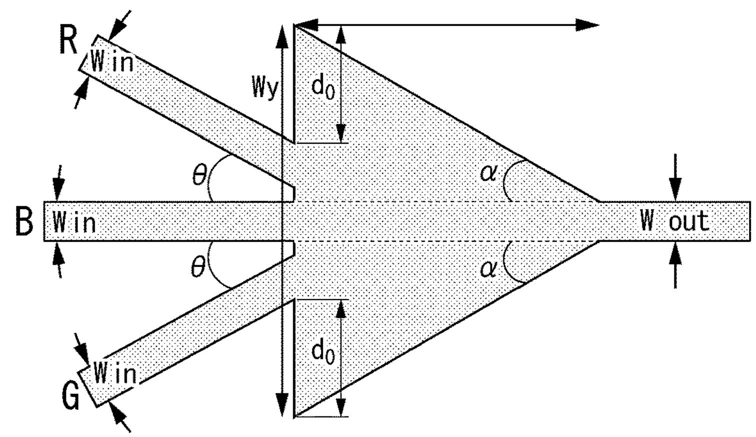
FIG. 18B is a schematic plan view showing a model of the Y-branch type optical coupler used in the simulation for Example 5-2.
Figure 18C:
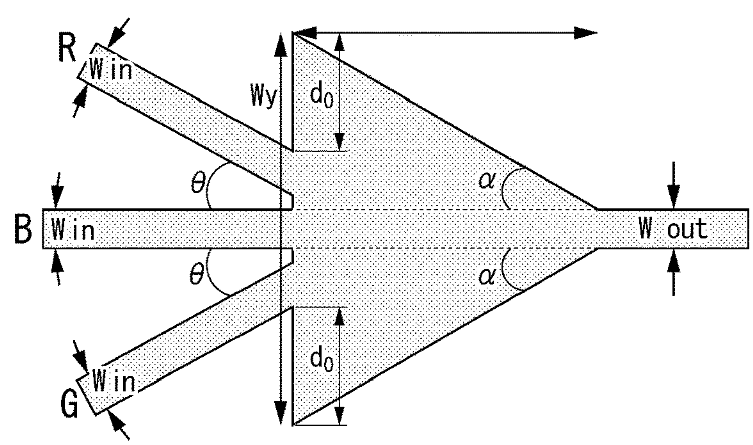
FIG. 18C is a schematic plan view showing a model of the Y-branch type optical coupler used in the simulation for Example 5-3.
Figure 18D:
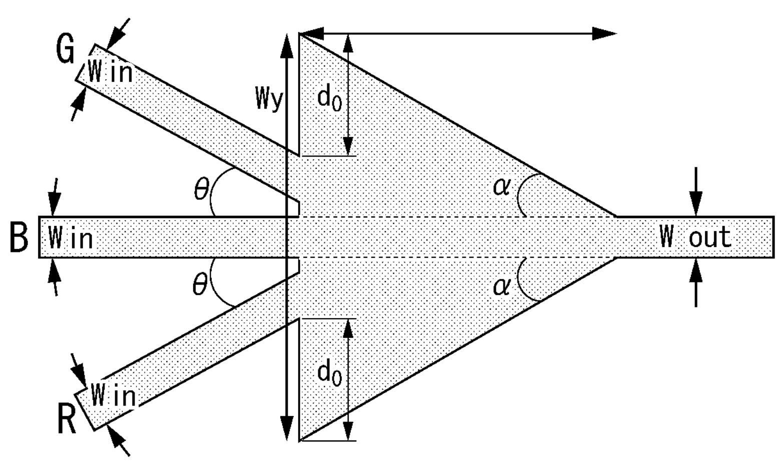
FIG. 18D is a schematic plan view showing a model of the Y-branch type optical coupler used in simulation for Example 5-4.

Examples 4-1 to 4-4 are configurations of the Y-branch type optical coupler shown in FIG. 3, but the dimensions, angles, and wavelengths of visible light to be coupled are changed. FIGS. 18A to 18D show the configurations of Examples 4-1 to 4-4, respectively. Examples 4-1 to 4-4 are cases in which the width of the input-side optical waveguide is different from the width of the output-side optical waveguide. That is, FIG. 18A shows the configuration of Example 4-1, FIG. 18B shows the configuration of Example 4-2, FIG. 18C shows the configuration of Example 4-3, and FIG. 18D shows the configuration of Example 4-4.

Table 5 shows results of a simulation of the propagation loss (dB) of each visible light of RGB.

TABLE 5

| | Branching length L (μm) | Input width Win (μm) | Output width Wout (μm) | Enc portion $d_0$ (μm) | Width of coupling part Wy (μm) | Incidence angle θ (degree) | Emission angle α (degree) | Coupling loss R (dB) | Coupling loss G (dB) | Coupling loss B (dB) | |
|---|---|---|---|---|---|---|---|---|---|---|---|
| Example 4-1 | 127 | 1 | 0.7 | 0.5 | 4 | 2 | 0.7 | 5 | 5 | 5 | R:G:B, θ > α |
| Example 4-2 | 268 | 1.5 | 0.7 | 0.5 | 5.5 | 2 | 0.4 | 5 | 5 | 5 | R:B:G, θ > α |
| Example 4-3 | 414 | 2 | 0.7 | 0.5 | 7 | 2 | 0.3 | 6 | 5 | 5 | R:B:G, θ > α |
| Example 4-4 | 21 | 1 | 0.7 | 0.5 | 4 | 2 | 4.1 | 3 | 5 | 5 | G:R:B, θ < α |

In all of Examples 4-1 to 4-4, the coupling loss of each visible light was 3 to 5 dB. Since the coupling loss is preferably 10 dB or less, it was good.

Examples 1 to 25 (Win=Wout)

Examples 1 to 25 are the configurations of the Y-branch type optical coupler shown in FIG. 3, but the dimensions, angles, and wavelengths of visible light to be coupled are changed.

Tables 6 and 7 show results of simulations of the propagation loss (dB) of each visible light of RGB.

TABLE 6

| | Branching length L (μm) | Input/output width Win = Wout (μm) | End portion $d_0$ (μm) | Width of coupling part Wy (μm) | Incidence angle θ (degree) | Emission angle α (degree) | Coupling loss R (dB) | Coupling loss G (dB) | Coupling loss B (dB) | Center |
|---|---|---|---|---|---|---|---|---|---|---|
| Example 1 | 40 | 0.7 | 0 | 2.1 | 2 | 1.0 | 4 | 5 | 5 | R |
| Example 2 | 132 | 0.7 | 0 | 2.1 | 2 | 0.3 | 2 | 4 | 4 | R |
| Example 3 | 46 | 0.7 | 0 | 2.1 | 2 | 0.9 | 5 | 2 | 4 | G |
| Example 4 | 223 | 0.7 | 0 | 2.1 | 2 | 0.2 | 5 | 5 | 4 | G |
| Example 5 | 288 | 0.7 | 0 | 2.1 | 2 | 0.1 | 5 | 4 | 2 | B |
| Example 6 | 450 | 0.7 | 0 | 2.1 | 2 | 0.1 | 4 | 5 | 2 | B |
| Example 7 | 60 | 0.7 | 0.5 | 3.1 | 2 | 1.1 | 4 | 5 | 5 | G |
| Example 8 | 490 | 0.7 | 0.5 | 3.1 | 2 | 0.1 | 5 | 4 | 5 | G |
| Example 9 | 97 | 0.7 | 0.5 | 3.1 | 2 | 0.7 | 5 | 4 | 3 | B |
| Example 10 | 290 | 0.7 | 0.5 | 3.1 | 2 | 0.2 | 5 | 4 | 5 | B |
| Example 11 | 117 | 0.7 | 0.5 | 3.1 | 2 | 0.6 | 3 | 5 | 5 | R |
| Example 12 | 228 | 0.7 | 1 | 4.1 | 2 | 0.4 | 2 | 6 | 6 | R |
| Example 13 | 328 | 0.7 | 1 | 4.1 | 2 | 0.3 | 5 | 6 | 4 | B |
| Example 14 | 328 | 0.7 | 1.5 | 5.1 | 2 | 0.4 | 4 | 7 | 7 | R |
| Example 15 | 475 | 0.7 | 1.5 | 5.1 | 2 | 0.3 | 5 | 5 | 9 | G |
| Example 16 | 172 | 0.7 | 2 | 6.1 | 2 | 0.9 | 6 | 9 | 10 | R |
| Example 17 | 288 | 0.7 | 2 | 6.1 | 2 | 0.5 | 8 | 9 | 8 | G |

TABLE 7

| | Branching length L (μm) | Input/output width Win = Wout (μm) | End portion $d_0$ (μm) | Width of coupling part Wy (μm) | Incidence angle θ (degree) | Emission angle α (degree) | Coupling loss R (dB) | Coupling loss G (dB) | Coupling loss B (dB) | Center |
|---|---|---|---|---|---|---|---|---|---|---|
| Example 18 | 290 | 0.7 | 0.5 | 3.1 | 1.15 | 0.2 | 5 | 4 | 5 | B |
| Example 19 | 290 | 0.7 | 0.5 | 3.1 | 1.5 | 0.2 | 5 | 4 | 5 | B |
| Example 10 | 290 | 0.7 | 0.5 | 3.1 | 2 | 0.2 | 5 | 4 | 5 | B |
| Example 20 | 290 | 0.7 | 0.5 | 3.1 | 5 | 0.2 | 5 | 5 | 5 | B |
| Example 21 | 290 | 0.7 | 0.5 | 3.1 | 8 | 0.2 | 6 | 6 | 5 | B |
| Example 22 | 290 | 0.7 | 0.5 | 3.1 | 10 | 0.2 | 6 | 7 | 5 | B |
| Example 23 | 290 | 0.7 | 0.5 | 3.1 | 15 | 0.2 | 8 | 10 | 5 | B |
| Example 2 | 132 | 0.7 | 0 | 2.1 | 2 | 0.3 | 2 | 4 | 4 | R |
| Example 24 | 132 | 0.7 | 0 | 2.1 | 15 | 0.3 | 2 | 9 | 10 | R |
| Example 7 | 60 | 0.7 | 0.5 | 3.1 | 2 | 1.1 | 4 | 5 | 5 | G |
| Example 25 | 60 | 0.7 | 0.5 | 3.1 | 15 | 1.1 | 10 | 5 | 10 | G |

Examples 1 to 6 are cases in which the distance $d_0$ in FIG. 3 is 0 and the width of the optical coupling part (the width at the lower bottom portion) Wy is 2.1 μm, and the length L and the first angle α of the optical coupling part are changed.

Examples 7 to 11 are cases in which the distance $d_0$ in FIG. 3 is 0.5 and the width of the optical coupling part (width at the bottom) Wy is 3.1 μm, and the length L and the first angle α of the optical coupling part are changed.

Examples 12 and 13 are cases in which the distance $d_0$ in FIG. 3 is 1 and the width of the optical coupling part (width at the bottom) Wy is 4.1 μm, and the length L and the first angle α of the optical coupling part are changed.

Examples 14 and 15 are cases in which the distance $d_0$ in FIG. 3 is 1.5 and the width of the optical coupling part (width at the bottom) Wy is 5.1 μm, and the length L and the first angle α of the optical coupling part are changed. Examples 16 and 17 are cases in which the distance $d_0$ in FIG. 3 is 2 and the width of the optical coupling part (width at the bottom) Wy is 6.1 μm, and the length L and the first angle α of the optical coupling part are changed.

In all of Examples 1 to 17, the coupling loss of each visible light was 2 to 10 dB. Since the coupling loss is preferably 10 dB or less, it was good.

Examples 18 to 23 are common to Example 10 in that the length L of the optical coupling part is 290 μm, and the distance $d_0$ in FIG. 3 is 0.5, the width of the optical coupling part (the width at the lower bottom portion) Wy is 3.1 μm and α is 0.2°, but the second angle θ is different.

In all of Examples 18 to 23, the coupling loss of each visible light was 4 to 10 dB. Since the coupling loss is preferably 10 dB or less, it was good.

Example 24 is common to Example 2 in that the length L of the optical coupling part is 132 μm, and the distance $d_0$ in FIG. 3 is 0, the width of the optical coupling part (the width at the lower bottom portion) Wy is 2.1 μm and α is 0.3°, but the second angle θ is different.

In Example 24, the coupling loss of each visible light was 2 to 10 dB. Since the coupling loss is preferably 10 dB or less, it was good.

Example 25 is common to Example 7 in that the length L of the optical coupling part is 60 μm, and the distance $d_0$ in FIG. 3 is 0, the width of the optical coupling part (width at the lower bottom portion) Wy is 3.1 μm and α is 1.1°, but the second angle θ is different.

In Example 25, the coupling loss of each visible light was 5 to 10 dB. Since the coupling loss is preferably 10 dB or less, it was good.

EXPLANATION OF REFERENCES

10 Substrate
20 Optical coupling functional layer
30 Laser light source
40 Mach-Zehnder type optical modulator
50 Optical coupling part
101, 102, 103Y Y-branch type optical coupler
101M, 102M, 103M Optical coupling member
400 Optical coupling member with light modulation function
1001, 1002, 1003, 2000 Light source module
5001 Optical engine

What is claimed is:

1. An optical coupler that couples a plurality of lights with different wavelengths, comprising:

an optical coupling part to which a plurality of input-side optical waveguides through which the plurality of lights propagate, and one output-side optical waveguide are connected, wherein the optical coupling part has an isosceles trapezoid shape of which a width is narrowed in a taper shape at a first angle from an input side to an output side in a plan view, at least two input-side optical waveguides among the plurality of input-side optical waveguides are disposed symmetrically with respect to a symmetry axis of the isosceles trapezoid, are inclined at a second angle that is different from the first angle, and are connected to a lower bottom portion of the isosceles trapezoid, and a difference between the first angle and the second angle is 0.9° or more and 14.8° or less.

2. The optical coupler according to claim 1, wherein the plurality of input-side optical waveguides include four or more input-side optical waveguides disposed symmetrically with respect to the symmetry axis, and two input-side optical waveguides adjacent to each other without sandwiching the symmetry axis are connected to the lower bottom portion of the isosceles trapezoid with one inclined at the second angle with respect to the other.

3. The optical coupler according to claim 1, wherein the plurality of input-side optical waveguides include an input-side optical waveguide that extends along the symmetry axis and that is connected to the lower bottom portion of the isosceles trapezoid shape.

4. The optical coupler according to claim 2, wherein the plurality of input-side optical waveguides include an input-side optical waveguide that extends along the symmetry axis and that is connected to the lower bottom portion of the isosceles trapezoid shape.

5. The optical coupler according to claim 1, wherein the number of the plurality of input-side optical waveguides is two, and a length of the optical coupling part is 6 μm or more and 303 μm or less.

6. The optical coupler according to claim 2, wherein the number of the plurality of input-side optical waveguides is four, and a length of the optical coupling part is 16 μm or more and 238 μm or less.

7. The optical coupler according to claim 3, wherein the number of the plurality of input-side optical waveguides is three, and a length of the optical coupling part is 9 μm or more and 490 μm or less.

8. An optical coupling member comprising:

a substrate made of a material different from lithium niobate; and an optical coupling functional layer made of a lithium niobate film and formed on a main surface of the substrate, wherein the optical coupler according to claim 1 is formed in the optical coupling functional layer.

9. A light source module comprising:

the optical coupling member according to claim 8; and a plurality of laser light sources configured to emit lights that are coupled by the optical coupling member.

10. An optical coupling member with an optical modulation function, comprising:

the optical coupling member according to claim 8; and a Mach-Zehnder type optical modulator connected to the optical coupling member and configured to guide a plurality of lights emitted from a plurality of laser light sources to the optical coupling member.

11. A light source module comprising:

the optical coupling member with a light modulation function according to claim 10; and a plurality of laser light sources configured to emit lights to be coupled by the optical coupling member with a light modulation function.

12. An optical engine comprising:

the light source module according to claim 9; and a light scanning mirror configured to reflect the light emitted from the light source module by changing an angle to display an image.

13. An optical engine comprising:

the light source module according to claim 11; and a light scanning mirror that reflects the light emitted from the light source module by changing an angle to display an image.

* * * * *